United States Patent
McCloskey et al.

(10) Patent No.: US 10,026,187 B2
(45) Date of Patent: Jul. 17, 2018

(54) USING IMAGE DATA TO CALCULATE AN OBJECT'S WEIGHT

(71) Applicant: Hand Held Products, Inc., Fort Mill, SC (US)

(72) Inventors: Scott McCloskey, Minneapolis, MN (US); Ryan Andrew Lloyd, Plymouth, MN (US)

(73) Assignee: Hand Held Products, Inc., Fort Mill, SC (US)

( * ) Notice: Subject to any disclaimer, the term of this patent is extended or adjusted under 35 U.S.C. 154(b) by 159 days.

(21) Appl. No.: 14/993,169

(22) Filed: Jan. 12, 2016

(65) Prior Publication Data

US 2017/0200275 A1    Jul. 13, 2017

(51) Int. Cl.
| | |
|---|---|
| G06K 9/00 | (2006.01) |
| G06T 7/20 | (2017.01) |
| G01G 23/35 | (2006.01) |
| G06T 7/00 | (2017.01) |
| G06T 7/60 | (2017.01) |

(52) U.S. Cl.
CPC .............. *G06T 7/20* (2013.01); *G01G 23/35* (2013.01); *G06T 7/001* (2013.01); *G06T 7/0044* (2013.01); *G06T 7/602* (2013.01); *G06T 2207/10016* (2013.01); *G06T 2207/30112* (2013.01)

(58) Field of Classification Search
None
See application file for complete search history.

(56) References Cited

U.S. PATENT DOCUMENTS

| | | | |
|---|---|---|---|
| 6,321,605 B1 | 11/2001 | Gagnon | |
| 6,832,725 B2 | 12/2004 | Gardiner et al. | |
| 7,128,266 B2 | 10/2006 | Marlton et al. | |
| 7,159,783 B2 | 1/2007 | Walczyk et al. | |
| 7,413,127 B2 | 8/2008 | Ehrhart et al. | |
| 7,489,813 B2 * | 2/2009 | Rutschmann | A61B 5/107 345/419 |
| 7,726,575 B2 | 6/2010 | Wang et al. | |
| 8,294,969 B2 | 10/2012 | Plesko | |
| 8,317,105 B2 | 11/2012 | Kotlarsky et al. | |

(Continued)

FOREIGN PATENT DOCUMENTS

| | | |
|---|---|---|
| JP | S55162018 A | 12/1980 |
| JP | 2008-008746 A | 1/2008 |

(Continued)

OTHER PUBLICATIONS

U.S. Appl. No. 14/715,916 for Evaluating Image Values filed May 19, 2015 (Ackley); 60 pages.

(Continued)

*Primary Examiner* — Tahmina Ansari
(74) *Attorney, Agent, or Firm* — Additon, Higgins & Pendleton, P.A.

(57) ABSTRACT

Systems and methods for calculating the weight of an object are provided. In one implementation, an apparatus for calculating weight comprises an image capture device and a processing device. The image capture device is configured to capture a plurality of images of a platform configured to support an object to be weighed, wherein the platform includes known pliability characteristics. The processing device is configured to calculate the weight of the object based on the plurality of images.

24 Claims, 4 Drawing Sheets

(56) References Cited

U.S. PATENT DOCUMENTS

| | | |
|---|---|---|
| 8,322,622 B2 | 12/2012 | Suzhou et al. |
| 8,366,005 B2 | 2/2013 | Kotlarsky et al. |
| 8,371,507 B2 | 2/2013 | Haggerty et al. |
| 8,376,233 B2 | 2/2013 | Van Horn et al. |
| 8,381,979 B2 | 2/2013 | Franz |
| 8,390,909 B2 | 3/2013 | Plesko |
| 8,406,520 B2* | 3/2013 | Henkel ............... G01V 5/0008 378/57 |
| 8,408,464 B2 | 4/2013 | Zhu et al. |
| 8,408,468 B2 | 4/2013 | Horn et al. |
| 8,408,469 B2 | 4/2013 | Good |
| 8,424,768 B2 | 4/2013 | Rueblinger et al. |
| 8,448,863 B2 | 5/2013 | Xian et al. |
| 8,457,013 B2 | 6/2013 | Essinger et al. |
| 8,459,557 B2 | 6/2013 | Havens et al. |
| 8,469,272 B2 | 6/2013 | Kearney |
| 8,474,712 B2 | 7/2013 | Kearney et al. |
| 8,479,992 B2 | 7/2013 | Kotlarsky et al. |
| 8,490,877 B2 | 7/2013 | Kearney |
| 8,517,271 B2 | 8/2013 | Kotlarsky et al. |
| 8,523,076 B2 | 9/2013 | Good |
| 8,528,818 B2 | 9/2013 | Ehrhart et al. |
| 8,544,737 B2 | 10/2013 | Gomez et al. |
| 8,548,420 B2 | 10/2013 | Grunow et al. |
| 8,550,335 B2 | 10/2013 | Samek et al. |
| 8,550,354 B2 | 10/2013 | Gannon et al. |
| 8,550,357 B2 | 10/2013 | Kearney |
| 8,556,174 B2 | 10/2013 | Kosecki et al. |
| 8,556,176 B2 | 10/2013 | Van Horn et al. |
| 8,556,177 B2 | 10/2013 | Hussey et al. |
| 8,559,767 B2 | 10/2013 | Barber et al. |
| 8,561,895 B2 | 10/2013 | Gomez et al. |
| 8,561,903 B2 | 10/2013 | Sauerwein |
| 8,561,905 B2 | 10/2013 | Edmonds et al. |
| 8,565,107 B2 | 10/2013 | Pease et al. |
| 8,571,307 B2 | 10/2013 | Li et al. |
| 8,579,200 B2 | 11/2013 | Samek et al. |
| 8,583,924 B2 | 11/2013 | Caballero et al. |
| 8,584,945 B2 | 11/2013 | Wang et al. |
| 8,587,595 B2 | 11/2013 | Wang |
| 8,587,697 B2 | 11/2013 | Hussey et al. |
| 8,588,869 B2 | 11/2013 | Sauerwein et al. |
| 8,590,789 B2 | 11/2013 | Nahill et al. |
| 8,596,539 B2 | 12/2013 | Havens et al. |
| 8,596,542 B2 | 12/2013 | Havens et al. |
| 8,596,543 B2 | 12/2013 | Havens et al. |
| 8,599,271 B2 | 12/2013 | Havens et al. |
| 8,599,957 B2 | 12/2013 | Peake et al. |
| 8,600,158 B2 | 12/2013 | Li et al. |
| 8,600,167 B2 | 12/2013 | Showering |
| 8,602,309 B2 | 12/2013 | Longacre et al. |
| 8,608,053 B2 | 12/2013 | Meier et al. |
| 8,608,071 B2 | 12/2013 | Liu et al. |
| 8,611,309 B2 | 12/2013 | Wang et al. |
| 8,615,487 B2 | 12/2013 | Gomez et al. |
| 8,621,123 B2 | 12/2013 | Caballero |
| 8,622,303 B2 | 1/2014 | Meier et al. |
| 8,628,013 B2 | 1/2014 | Ding |
| 8,628,015 B2 | 1/2014 | Wang et al. |
| 8,628,016 B2 | 1/2014 | Winegar |
| 8,629,926 B2 | 1/2014 | Wang |
| 8,630,491 B2 | 1/2014 | Longacre et al. |
| 8,635,309 B2 | 1/2014 | Berthiaume et al. |
| 8,636,200 B2 | 1/2014 | Kearney |
| 8,636,212 B2 | 1/2014 | Nahill et al. |
| 8,636,215 B2 | 1/2014 | Ding et al. |
| 8,636,224 B2 | 1/2014 | Wang |
| 8,638,806 B2 | 1/2014 | Wang et al. |
| 8,640,958 B2 | 2/2014 | Lu et al. |
| 8,640,960 B2 | 2/2014 | Wang et al. |
| 8,643,717 B2 | 2/2014 | Li et al. |
| 8,646,692 B2 | 2/2014 | Meier et al. |
| 8,646,694 B2 | 2/2014 | Wang et al. |
| 8,657,200 B2 | 2/2014 | Ren et al. |
| 8,659,397 B2 | 2/2014 | Vargo et al. |
| 8,668,149 B2 | 3/2014 | Good |
| 8,678,285 B2 | 3/2014 | Kearney |
| 8,678,286 B2 | 3/2014 | Smith et al. |
| 8,682,077 B1 | 3/2014 | Longacre |
| D702,237 S | 4/2014 | Oberpriller et al. |
| 8,687,282 B2 | 4/2014 | Feng et al. |
| 8,692,927 B2 | 4/2014 | Pease et al. |
| 8,695,880 B2 | 4/2014 | Bremer et al. |
| 8,698,949 B2 | 4/2014 | Grunow et al. |
| 8,702,000 B2 | 4/2014 | Barber et al. |
| 8,717,494 B2 | 5/2014 | Gannon |
| 8,720,783 B2 | 5/2014 | Biss et al. |
| 8,723,804 B2 | 5/2014 | Fletcher et al. |
| 8,723,904 B2 | 5/2014 | Marty et al. |
| 8,727,223 B2 | 5/2014 | Wang |
| 8,740,082 B2 | 6/2014 | Wilz |
| 8,740,085 B2 | 6/2014 | Furlong et al. |
| 8,746,563 B2 | 6/2014 | Hennick et al. |
| 8,750,445 B2 | 6/2014 | Peake et al. |
| 8,752,766 B2 | 6/2014 | Xian et al. |
| 8,756,059 B2 | 6/2014 | Braho et al. |
| 8,757,495 B2 | 6/2014 | Qu et al. |
| 8,760,563 B2 | 6/2014 | Koziol et al. |
| 8,736,909 B2 | 7/2014 | Reed et al. |
| 8,777,108 B2 | 7/2014 | Coyle |
| 8,777,109 B2 | 7/2014 | Oberpriller et al. |
| 8,779,898 B2 | 7/2014 | Havens et al. |
| 8,781,520 B2 | 7/2014 | Payne et al. |
| 8,783,573 B2 | 7/2014 | Havens et al. |
| 8,789,757 B2 | 7/2014 | Barten |
| 8,789,758 B2 | 7/2014 | Hawley et al. |
| 8,789,759 B2 | 7/2014 | Xian et al. |
| 8,794,520 B2 | 8/2014 | Wang et al. |
| 8,794,522 B2 | 8/2014 | Ehrhart |
| 8,794,525 B2 | 8/2014 | Amundsen et al. |
| 8,794,526 B2 | 8/2014 | Wang et al. |
| 8,798,367 B2 | 8/2014 | Ellis |
| 8,807,431 B2 | 8/2014 | Wang et al. |
| 8,807,432 B2 | 8/2014 | Van Horn et al. |
| 8,820,630 B2 | 9/2014 | Qu et al. |
| 8,822,848 B2 | 9/2014 | Meagher |
| 8,824,692 B2 | 9/2014 | Sheerin et al. |
| 8,824,696 B2 | 9/2014 | Braho |
| 8,842,849 B2 | 9/2014 | Wahl et al. |
| 8,844,822 B2 | 9/2014 | Kotlarsky et al. |
| 8,844,823 B2 | 9/2014 | Fritz et al. |
| 8,849,019 B2 | 9/2014 | Li et al. |
| D716,285 S | 10/2014 | Chaney et al. |
| 8,851,383 B2 | 10/2014 | Yeakley et al. |
| 8,854,633 B2 | 10/2014 | Laffargue |
| 8,866,963 B2 | 10/2014 | Grunow et al. |
| 8,868,421 B2 | 10/2014 | Braho et al. |
| 8,868,519 B2 | 10/2014 | Maloy et al. |
| 8,868,802 B2 | 10/2014 | Barten |
| 8,868,803 B2 | 10/2014 | Bremer et al. |
| 8,870,074 B1 | 10/2014 | Gannon |
| 8,879,639 B2 | 11/2014 | Sauerwein |
| 8,880,426 B2 | 11/2014 | Smith |
| 8,881,983 B2 | 11/2014 | Havens et al. |
| 8,881,987 B2 | 11/2014 | Wang |
| 8,903,172 B2 | 12/2014 | Smith |
| 8,908,995 B2 | 12/2014 | Benos et al. |
| 8,910,870 B2 | 12/2014 | Li et al. |
| 8,910,875 B2 | 12/2014 | Ren et al. |
| 8,914,290 B2 | 12/2014 | Hendrickson et al. |
| 8,914,788 B2 | 12/2014 | Pettinelli et al. |
| 8,915,439 B2 | 12/2014 | Feng et al. |
| 8,915,444 B2 | 12/2014 | Havens et al. |
| 8,916,789 B2 | 12/2014 | Woodburn |
| 8,918,250 B2 | 12/2014 | Hollifield |
| 8,918,564 B2 | 12/2014 | Caballero |
| 8,925,818 B2 | 1/2015 | Kosecki et al. |
| 8,939,374 B2 | 1/2015 | Jovanovski et al. |
| 8,942,480 B2 | 1/2015 | Ellis |
| 8,944,313 B2 | 2/2015 | Williams et al. |
| 8,944,327 B2 | 2/2015 | Meier et al. |
| 8,944,332 B2 | 2/2015 | Harding et al. |
| 8,950,678 B2 | 2/2015 | Germaine et al. |
| D723,560 S | 3/2015 | Zhou et al. |

(56) References Cited

U.S. PATENT DOCUMENTS

| | | | |
|---|---|---|---|
| 8,967,468 B2 | 3/2015 | Gomez et al. | |
| 8,971,346 B2 | 3/2015 | Sevier | |
| 8,976,030 B2 | 3/2015 | Cunningham et al. | |
| 8,976,368 B2 | 3/2015 | Akel et al. | |
| 8,978,981 B2 | 3/2015 | Guan | |
| 8,978,983 B2 | 3/2015 | Bremer et al. | |
| 8,978,984 B2 | 3/2015 | Hennick et al. | |
| 8,985,456 B2 | 3/2015 | Zhu et al. | |
| 8,985,457 B2 | 3/2015 | Soule et al. | |
| 8,985,459 B2 | 3/2015 | Kearney et al. | |
| 8,985,461 B2 | 3/2015 | Gelay et al. | |
| 8,988,578 B2 | 3/2015 | Showering | |
| 8,988,590 B2 | 3/2015 | Gillet et al. | |
| 8,991,704 B2 | 3/2015 | Hopper et al. | |
| 8,996,194 B2 | 3/2015 | Davis et al. | |
| 8,996,384 B2 | 3/2015 | Funyak et al. | |
| 8,998,091 B2 | 4/2015 | Edmonds et al. | |
| 9,002,641 B2 | 4/2015 | Showering | |
| 9,007,368 B2 | 4/2015 | Laffargue et al. | |
| 9,010,641 B2 | 4/2015 | Qu et al. | |
| 9,015,513 B2 | 4/2015 | Murawski et al. | |
| 9,016,576 B2 | 4/2015 | Brady et al. | |
| D730,357 S | 5/2015 | Fitch et al. | |
| 9,022,288 B2 | 5/2015 | Nahill et al. | |
| 9,030,964 B2 | 5/2015 | Essinger et al. | |
| 9,033,240 B2 | 5/2015 | Smith et al. | |
| 9,033,242 B2 | 5/2015 | Gillet et al. | |
| 9,036,054 B2 | 5/2015 | Koziol et al. | |
| 9,037,344 B2 | 5/2015 | Chamberlin | |
| 9,038,911 B2 | 5/2015 | Xian et al. | |
| 9,038,915 B2 | 5/2015 | Smith | |
| D730,901 S | 6/2015 | Oberpriller et al. | |
| D730,902 S | 6/2015 | Fitch et al. | |
| D733,112 S | 6/2015 | Chaney et al. | |
| 9,047,098 B2 | 6/2015 | Barten | |
| 9,047,359 B2 | 6/2015 | Caballero et al. | |
| 9,047,420 B2 | 6/2015 | Caballero | |
| 9,047,525 B2 | 6/2015 | Barber | |
| 9,047,531 B2 | 6/2015 | Showering et al. | |
| 9,049,640 B2 | 6/2015 | Wang et al. | |
| 9,053,055 B2 | 6/2015 | Caballero | |
| 9,053,378 B1 | 6/2015 | Hou et al. | |
| 9,053,380 B2 | 6/2015 | Xian et al. | |
| 9,057,641 B2 | 6/2015 | Amundsen et al. | |
| 9,058,526 B2 | 6/2015 | Powilleit | |
| 9,064,165 B2 | 6/2015 | Havens et al. | |
| 9,064,167 B2 | 6/2015 | Xian et al. | |
| 9,064,168 B2 | 6/2015 | Todeschini et al. | |
| 9,064,254 B2 | 6/2015 | Todeschini et al. | |
| 9,066,032 B2 | 6/2015 | Wang | |
| 9,070,032 B2 | 6/2015 | Corcoran | |
| D734,339 S | 7/2015 | Zhou et al. | |
| D734,751 S | 7/2015 | Oberpriller et al. | |
| 9,082,023 B2 | 7/2015 | Feng et al. | |
| 9,224,022 B2 | 12/2015 | Ackley et al. | |
| 9,224,027 B2 | 12/2015 | Van Horn et al. | |
| D747,321 S | 1/2016 | London et al. | |
| 9,230,140 B1 | 1/2016 | Ackley | |
| 9,443,123 B2 | 1/2016 | Hejl | |
| 9,250,712 B1 | 2/2016 | Todeschini | |
| 9,258,033 B2 | 2/2016 | Showering | |
| 9,262,633 B1 | 2/2016 | Todeschini et al. | |
| 9,310,609 B2 | 4/2016 | Rueblinger et al. | |
| D757,009 S | 5/2016 | Oberpriller et al. | |
| 9,342,724 B2 | 5/2016 | McCloskey | |
| 9,375,945 B1 | 6/2016 | Bowles | |
| D760,719 S | 7/2016 | Zhou et al. | |
| 9,390,596 B1 | 7/2016 | Todeschini | |
| D762,604 S | 8/2016 | Fitch et al. | |
| D762,647 S | 8/2016 | Fitch et al. | |
| 9,412,242 B2 | 8/2016 | Van Horn et al. | |
| D766,244 S | 9/2016 | Zhou et al. | |
| 9,443,222 B2 | 9/2016 | Singel et al. | |
| 9,464,885 B2 * | 10/2016 | Lloyd | G01B 11/24 |
| 9,478,113 B2 | 10/2016 | Xie et al. | |
| 2005/0031193 A1 * | 2/2005 | Rutschmann | A61B 5/107 382/154 |
| 2005/0083332 A1 * | 4/2005 | Hung | G06T 13/40 345/473 |
| 2006/0018279 A1 | 1/2006 | Agrawal et al. | |
| 2007/0063048 A1 | 3/2007 | Havens et al. | |
| 2008/0089479 A1 * | 4/2008 | Henkel | G01V 5/0008 378/57 |
| 2009/0134221 A1 | 5/2009 | Zhu et al. | |
| 2010/0177076 A1 | 7/2010 | Essinger et al. | |
| 2010/0177080 A1 | 7/2010 | Essinger et al. | |
| 2010/0177707 A1 | 7/2010 | Essinger et al. | |
| 2010/0177749 A1 | 7/2010 | Essinger et al. | |
| 2011/0169999 A1 | 7/2011 | Grunow et al. | |
| 2011/0202554 A1 | 8/2011 | Powilleit et al. | |
| 2012/0111946 A1 | 5/2012 | Golant | |
| 2012/0168512 A1 | 7/2012 | Kotlarsky et al. | |
| 2012/0193423 A1 | 8/2012 | Samek | |
| 2012/0203647 A1 | 8/2012 | Smith | |
| 2012/0207351 A1 * | 8/2012 | Delianski | G01V 5/0016 382/103 |
| 2012/0223141 A1 | 9/2012 | Good et al. | |
| 2012/0321168 A1 * | 12/2012 | Deitz | A61B 5/0555 382/132 |
| 2013/0043312 A1 | 2/2013 | Van Horn | |
| 2013/0075168 A1 | 3/2013 | Amundsen et al. | |
| 2013/0175341 A1 | 7/2013 | Kearney et al. | |
| 2013/0175343 A1 | 7/2013 | Good | |
| 2013/0257744 A1 | 10/2013 | Daghigh et al. | |
| 2013/0257759 A1 | 10/2013 | Daghigh | |
| 2013/0270346 A1 | 10/2013 | Xian et al. | |
| 2013/0287258 A1 | 10/2013 | Kearney | |
| 2013/0292475 A1 | 11/2013 | Kotlarsky et al. | |
| 2013/0292477 A1 | 11/2013 | Hennick et al. | |
| 2013/0293539 A1 | 11/2013 | Hunt et al. | |
| 2013/0293540 A1 | 11/2013 | Laffargue et al. | |
| 2013/0306728 A1 | 11/2013 | Thuries et al. | |
| 2013/0306731 A1 | 11/2013 | Pedraro | |
| 2013/0307964 A1 | 11/2013 | Bremer et al. | |
| 2013/0308625 A1 | 11/2013 | Corcoran | |
| 2013/0313324 A1 | 11/2013 | Koziol et al. | |
| 2013/0313325 A1 | 11/2013 | Wilz et al. | |
| 2013/0342717 A1 | 12/2013 | Havens et al. | |
| 2014/0001267 A1 | 1/2014 | Giordano et al. | |
| 2014/0002828 A1 | 1/2014 | Laffargue et al. | |
| 2014/0008439 A1 | 1/2014 | Wang | |
| 2014/0025584 A1 | 1/2014 | Liu et al. | |
| 2014/0034734 A1 | 2/2014 | Sauerwein | |
| 2014/0036848 A1 | 2/2014 | Pease et al. | |
| 2014/0039693 A1 | 2/2014 | Havens et al. | |
| 2014/0042814 A1 | 2/2014 | Kather et al. | |
| 2014/0049120 A1 | 2/2014 | Kohtz et al. | |
| 2014/0049635 A1 | 2/2014 | Laffargue et al. | |
| 2014/0061306 A1 | 3/2014 | Wu et al. | |
| 2014/0063289 A1 | 3/2014 | Hussey et al. | |
| 2014/0066136 A1 | 3/2014 | Sauerwein et al. | |
| 2014/0067692 A1 | 3/2014 | Ye et al. | |
| 2014/0070005 A1 | 3/2014 | Nahill et al. | |
| 2014/0071840 A1 | 3/2014 | Venancio | |
| 2014/0074746 A1 | 3/2014 | Wang | |
| 2014/0076974 A1 | 3/2014 | Havens et al. | |
| 2014/0078341 A1 | 3/2014 | Havens et al. | |
| 2014/0078342 A1 | 3/2014 | Li et al. | |
| 2014/0078345 A1 | 3/2014 | Showering | |
| 2014/0098792 A1 | 4/2014 | Wang et al. | |
| 2014/0100774 A1 | 4/2014 | Showering | |
| 2014/0100813 A1 | 4/2014 | Showering | |
| 2014/0103115 A1 | 4/2014 | Meier et al. | |
| 2014/0104413 A1 | 4/2014 | McCloskey et al. | |
| 2014/0104414 A1 | 4/2014 | McCloskey et al. | |
| 2014/0104416 A1 | 4/2014 | Li et al. | |
| 2014/0104451 A1 | 4/2014 | Todeschini et al. | |
| 2014/0106594 A1 | 4/2014 | Skvoretz | |
| 2014/0106725 A1 | 4/2014 | Sauerwein | |
| 2014/0108010 A1 | 4/2014 | Maltseff et al. | |
| 2014/0108402 A1 | 4/2014 | Gomez et al. | |
| 2014/0108682 A1 | 4/2014 | Caballero | |
| 2014/0110485 A1 | 4/2014 | Toa et al. | |
| 2014/0114530 A1 | 4/2014 | Fitch et al. | |

(56) References Cited

U.S. PATENT DOCUMENTS

| | | |
|---|---|---|
| 2014/0121438 A1 | 5/2014 | Kearney |
| 2014/0121445 A1 | 5/2014 | Ding et al. |
| 2014/0124577 A1 | 5/2014 | Wang et al. |
| 2014/0124579 A1 | 5/2014 | Ding |
| 2014/0125842 A1 | 5/2014 | Winegar |
| 2014/0125853 A1 | 5/2014 | Wang |
| 2014/0125999 A1 | 5/2014 | Longacre et al. |
| 2014/0129378 A1 | 5/2014 | Richardson |
| 2014/0131441 A1 | 5/2014 | Nahill et al. |
| 2014/0131443 A1 | 5/2014 | Smith |
| 2014/0131444 A1 | 5/2014 | Wang |
| 2014/0131448 A1 | 5/2014 | Xian et al. |
| 2014/0133379 A1 | 5/2014 | Wang et al. |
| 2014/0136208 A1 | 5/2014 | Maltseff et al. |
| 2014/0140585 A1 | 5/2014 | Wang |
| 2014/0151453 A1 | 6/2014 | Meier et al. |
| 2014/0152882 A1 | 6/2014 | Samek et al. |
| 2014/0158770 A1 | 6/2014 | Sevier et al. |
| 2014/0159869 A1 | 6/2014 | Zumsteg et al. |
| 2014/0166755 A1 | 6/2014 | Liu et al. |
| 2014/0166757 A1 | 6/2014 | Smith |
| 2014/0166759 A1 | 6/2014 | Liu et al. |
| 2014/0168787 A1 | 6/2014 | Wang et al. |
| 2014/0175165 A1 | 6/2014 | Havens et al. |
| 2014/0175172 A1 | 6/2014 | Jovanovski et al. |
| 2014/0191644 A1 | 7/2014 | Chaney |
| 2014/0191913 A1 | 7/2014 | Ge et al. |
| 2014/0197238 A1 | 7/2014 | Lui et al. |
| 2014/0197239 A1 | 7/2014 | Havens et al. |
| 2014/0197304 A1 | 7/2014 | Feng et al. |
| 2014/0203087 A1 | 7/2014 | Smith et al. |
| 2014/0204268 A1 | 7/2014 | Grunow et al. |
| 2014/0214631 A1 | 7/2014 | Hansen |
| 2014/0217166 A1 | 8/2014 | Berthiaume et al. |
| 2014/0217180 A1 | 8/2014 | Liu |
| 2014/0231500 A1 | 8/2014 | Ehrhart et al. |
| 2014/0232930 A1 | 8/2014 | Anderson |
| 2014/0247315 A1 | 9/2014 | Marty et al. |
| 2014/0263493 A1 | 9/2014 | Amurgis et al. |
| 2014/0263645 A1 | 9/2014 | Smith et al. |
| 2014/0270196 A1 | 9/2014 | Braho et al. |
| 2014/0270229 A1 | 9/2014 | Braho |
| 2014/0278387 A1 | 9/2014 | DiGregorio |
| 2014/0282210 A1 | 9/2014 | Bianconi |
| 2014/0284384 A1 | 9/2014 | Lu et al. |
| 2014/0288933 A1 | 9/2014 | Braho et al. |
| 2014/0297058 A1 | 10/2014 | Barker et al. |
| 2014/0299665 A1 | 10/2014 | Barber et al. |
| 2014/0312121 A1 | 10/2014 | Lu et al. |
| 2014/0319220 A1 | 10/2014 | Coyle |
| 2014/0319221 A1 | 10/2014 | Oberpriller et al. |
| 2014/0326787 A1 | 11/2014 | Barten |
| 2014/0332590 A1 | 11/2014 | Wang et al. |
| 2014/0344943 A1 | 11/2014 | Todeschini et al. |
| 2014/0346233 A1 | 11/2014 | Liu et al. |
| 2014/0351317 A1 | 11/2014 | Smith et al. |
| 2014/0353373 A1 | 12/2014 | Van Horn et al. |
| 2014/0361073 A1 | 12/2014 | Qu et al. |
| 2014/0361082 A1 | 12/2014 | Xian et al. |
| 2014/0362184 A1 | 12/2014 | Jovanovski et al. |
| 2014/0363015 A1 | 12/2014 | Braho |
| 2014/0369511 A1 | 12/2014 | Sheerin et al. |
| 2014/0374483 A1 | 12/2014 | Lu |
| 2014/0374485 A1 | 12/2014 | Xian et al. |
| 2015/0001301 A1 | 1/2015 | Ouyang |
| 2015/0001304 A1 | 1/2015 | Todeschini |
| 2015/0003673 A1 | 1/2015 | Fletcher |
| 2015/0009338 A1 | 1/2015 | Laffargue et al. |
| 2015/0009610 A1 | 1/2015 | London et al. |
| 2015/0014416 A1 | 1/2015 | Kotlarsky et al. |
| 2015/0021397 A1 | 1/2015 | Rueblinger et al. |
| 2015/0028102 A1 | 1/2015 | Ren et al. |
| 2015/0028103 A1 | 1/2015 | Jiang |
| 2015/0028104 A1 | 1/2015 | Ma et al. |
| 2015/0029002 A1 | 1/2015 | Yeakley et al. |
| 2015/0032709 A1 | 1/2015 | Maloy et al. |
| 2015/0039309 A1 | 2/2015 | Braho et al. |
| 2015/0040378 A1 | 2/2015 | Saber et al. |
| 2015/0048168 A1 | 2/2015 | Fritz et al. |
| 2015/0049347 A1 | 2/2015 | Laffargue et al. |
| 2015/0051992 A1 | 2/2015 | Smith |
| 2015/0053766 A1 | 2/2015 | Havens et al. |
| 2015/0053768 A1 | 2/2015 | Wang et al. |
| 2015/0053769 A1 | 2/2015 | Thuries et al. |
| 2015/0062366 A1 | 3/2015 | Liu et al. |
| 2015/0063215 A1 | 3/2015 | Wang |
| 2015/0063676 A1 | 3/2015 | Lloyd et al. |
| 2015/0069130 A1 | 3/2015 | Gannon |
| 2015/0071818 A1 | 3/2015 | Todeschini |
| 2015/0082857 A1* | 3/2015 | Reed .................. G01G 23/01 73/1.13 |
| 2015/0083800 A1 | 3/2015 | Li et al. |
| 2015/0086114 A1 | 3/2015 | Todeschini |
| 2015/0088522 A1 | 3/2015 | Hendrickson et al. |
| 2015/0096872 A1 | 4/2015 | Woodburn |
| 2015/0099557 A1 | 4/2015 | Pettinelli et al. |
| 2015/0100196 A1 | 4/2015 | Hollifield |
| 2015/0102109 A1 | 4/2015 | Huck |
| 2015/0115035 A1 | 4/2015 | Meier et al. |
| 2015/0127791 A1 | 5/2015 | Kosecki et al. |
| 2015/0128116 A1 | 5/2015 | Chen et al. |
| 2015/0129659 A1 | 5/2015 | Feng et al. |
| 2015/0133047 A1 | 5/2015 | Smith et al. |
| 2015/0134470 A1 | 5/2015 | Hejl et al. |
| 2015/0136851 A1 | 5/2015 | Harding et al. |
| 2015/0136854 A1 | 5/2015 | Lu et al. |
| 2015/0142492 A1 | 5/2015 | Kumar |
| 2015/0144692 A1 | 5/2015 | Hejl |
| 2015/0144698 A1 | 5/2015 | Teng et al. |
| 2015/0144701 A1 | 5/2015 | Xian et al. |
| 2015/0149946 A1 | 5/2015 | Benos et al. |
| 2015/0161429 A1 | 6/2015 | Xian |
| 2015/0169925 A1 | 6/2015 | Chang et al. |
| 2015/0169929 A1 | 6/2015 | Williams et al. |
| 2015/0186703 A1 | 7/2015 | Chen et al. |
| 2015/0193644 A1 | 7/2015 | Kearney et al. |
| 2015/0193645 A1 | 7/2015 | Colavito et al. |
| 2015/0199957 A1 | 7/2015 | Funyak et al. |
| 2015/0204671 A1 | 7/2015 | Showering |
| 2015/0210199 A1 | 7/2015 | Payne |
| 2015/0220753 A1 | 8/2015 | Zhu et al. |
| 2015/0254485 A1 | 9/2015 | Feng et al. |
| 2015/0327012 A1 | 11/2015 | Bian et al. |
| 2016/0014251 A1 | 1/2016 | Hejl |
| 2016/0040982 A1 | 2/2016 | Li et al. |
| 2016/0042241 A1 | 2/2016 | Todeschini |
| 2016/0057230 A1 | 2/2016 | Todeschini et al. |
| 2016/0109219 A1 | 4/2016 | Ackley et al. |
| 2016/0109220 A1 | 4/2016 | Laffargue |
| 2016/0109224 A1 | 4/2016 | Thuries et al. |
| 2016/0112631 A1 | 4/2016 | Ackley et al. |
| 2016/0112643 A1 | 4/2016 | Laffargue et al. |
| 2016/0124516 A1 | 5/2016 | Schoon et al. |
| 2016/0125217 A1 | 5/2016 | Todeschini |
| 2016/0125342 A1 | 5/2016 | Miller et al. |
| 2016/0133253 A1 | 5/2016 | Braho et al. |
| 2016/0171720 A1 | 6/2016 | Todeschini |
| 2016/0178479 A1 | 6/2016 | Goldsmith |
| 2016/0180678 A1 | 6/2016 | Ackley et al. |
| 2016/0189087 A1 | 6/2016 | Morton et al. |
| 2016/0125873 A1 | 7/2016 | Braho et al. |
| 2016/0227912 A1 | 8/2016 | Oberpriller et al. |
| 2016/0232891 A1 | 8/2016 | Pecorari |
| 2016/0292477 A1 | 10/2016 | Bidwell |
| 2016/0294779 A1 | 10/2016 | Yeakley et al. |
| 2016/0306769 A1 | 10/2016 | Kohtz et al. |
| 2016/0314276 A1 | 10/2016 | Sewell et al. |
| 2016/0314294 A1 | 10/2016 | Kubler et al. |
| 2017/0200275 A1* | 7/2017 | McCloskey .............. G06T 7/20 |

FOREIGN PATENT DOCUMENTS

| | | |
|---|---|---|
| JP | 2009-145085 A | 7/2009 |
| WO | 2013163789 A1 | 11/2013 |

(56) References Cited

FOREIGN PATENT DOCUMENTS

| WO | 2013173985 A1 | 11/2013 |
|---|---|---|
| WO | 2014019130 A1 | 2/2014 |
| WO | 2014110495 A1 | 7/2014 |
| WO | 2014/142596 A1 | 9/2014 |

OTHER PUBLICATIONS

U.S. Appl. No. 29/525,068 for Tablet Computer With Removable Scanning Device filed Apr. 27, 2015 (Schulte et al.); 19 pages.
U.S. Appl. No. 29/468,118 for an Electronic Device Case, filed Sep. 26, 2013 (Oberpriller et al.); 44 pages.
U.S. Appl. No. 29/530,600 for Cyclone filed Jun. 18, 2015 (Vargo et al); 16 pages.
U.S. Appl. No. 14/707,123 for Application Independent DEX/UCS Interface filed May 8, 2015 (Pape); 47 pages.
U.S. Appl. No. 14/283,282 for Terminal Having Illumination and Focus Control filed May 21, 2014 (Liu et al.); 31 pages; now abandoned.
U.S. Appl. No. 14/705,407 for Method and System to Protect Software-Based Network-Connected Devices From Advanced Persistent Threat filed May 6, 2015 (Hussey et al.); 42 pages.
U.S. Appl. No. 14/704,050 for Intermediate Linear Positioning filed May 5, 2015 (Charpentier et al.); 60 pages.
U.S. Appl. No. 14/705,012 for Hands-Free Human Machine Interface Responsive to a Driver of a Vehicle filed May 6, 2015 (Fitch et al.); 44 pages.
U.S. Appl. No. 14/715,672 for Augumented Reality Enabled Hazard Display filed May 19, 2015 (Venkatesha et al.); 35 pages.
U.S. Appl. No. 14/735,717 for Indicia-Reading Systems Having an Interface With a User's Nervous System filed Jun. 10, 2015 (Todeschini); 39 pages.

U.S. Appl. No. 14/702,110 for System and Method for Regulating Barcode Data Injection Into a Running Application on a Smart Device filed May 1, 2015 (Todeschini et al.); 38 pages.
U.S. Appl. No. 14/747,197 for Optical Pattern Projector filed Jun. 23, 2015 (Thuries et al.); 33 pages.
U.S. Appl. No. 14/702,979 for Tracking Battery Conditions filed May 4, 2015 (Young et al.); 70 pages.
U.S. Appl. No. 29/529,441 for Indicia Reading Device filed Jun. 8, 2015 (Zhou et al.); 14 pages.
U.S. Appl. No. 14/747,490 for Dual-Projector Three-Dimensional Scanner filed Jun. 23, 2015 (Jovanovski et al.); 40 pages.
U.S. Appl. No. 14/740,320 for Tactile Switch for a Mobile Electronic Device filed Jun. 16, 2015 (Bamdringa); 38 pages.
U.S. Appl. No. 14/740,373 for Calibrating a Volume Dimensioner filed Jun. 16, 2015 (Ackley et al.); 63 pages.
Combined Search and Examination Report in counterpart GB Application No. 1700222.1 dated Mar. 23, 2017, pp. 1-8.
U.S. Appl. No. 13/367,978, filed Feb. 7, 2012, (Feng et al.); now abandoned.
U.S. Appl. No. 14/277,337 for Multipurpose Optical Reader, filed May 14, 2014 (Jovanovski et al.); 59 pages; now abandoned.
U.S. Appl. No. 14/446,391 for Multifunction Point of Sale Apparatus With Optical Signature Capture filed Jul. 30, 2014 (Good et al.); 37 pages; now abandoned.
U.S. Appl. No. 29/516,892 for Table Computer filed Feb. 6, 2015 (Bidwell et al.); 13 pages.
U.S. Appl. No. 29/523,098 for Handle for a Tablet Computer filed Apr. 7, 2015 (Bidwell et al.); 17 pages.
U.S. Appl. No. 29/528,890 for Mobile Computer Housing filed Jun. 2, 2015 (Fitch et al.); 61 pages.
U.S. Appl. No. 29/526,918 for Charging Base filed May 14, 2015 (Fitch et al.); 10 pages.

* cited by examiner

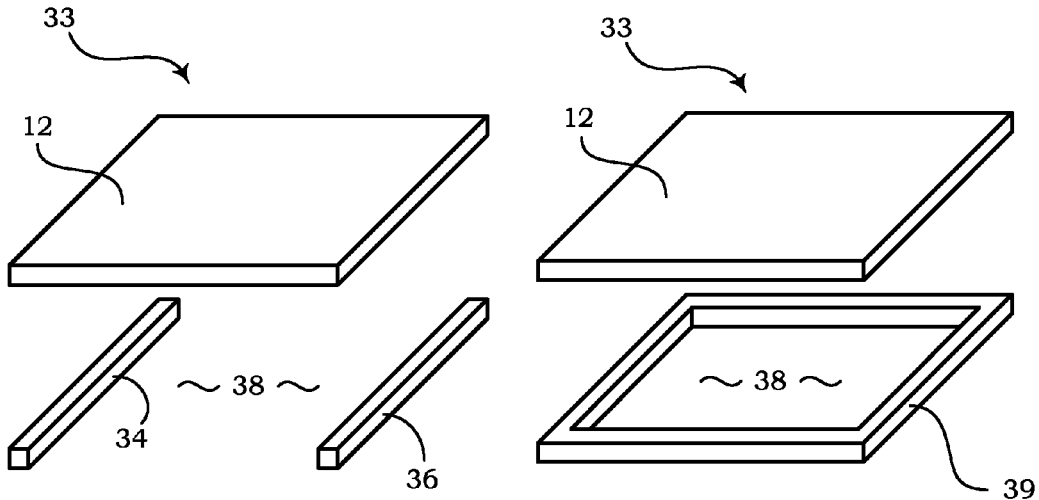
FIG. 5   FIG. 6
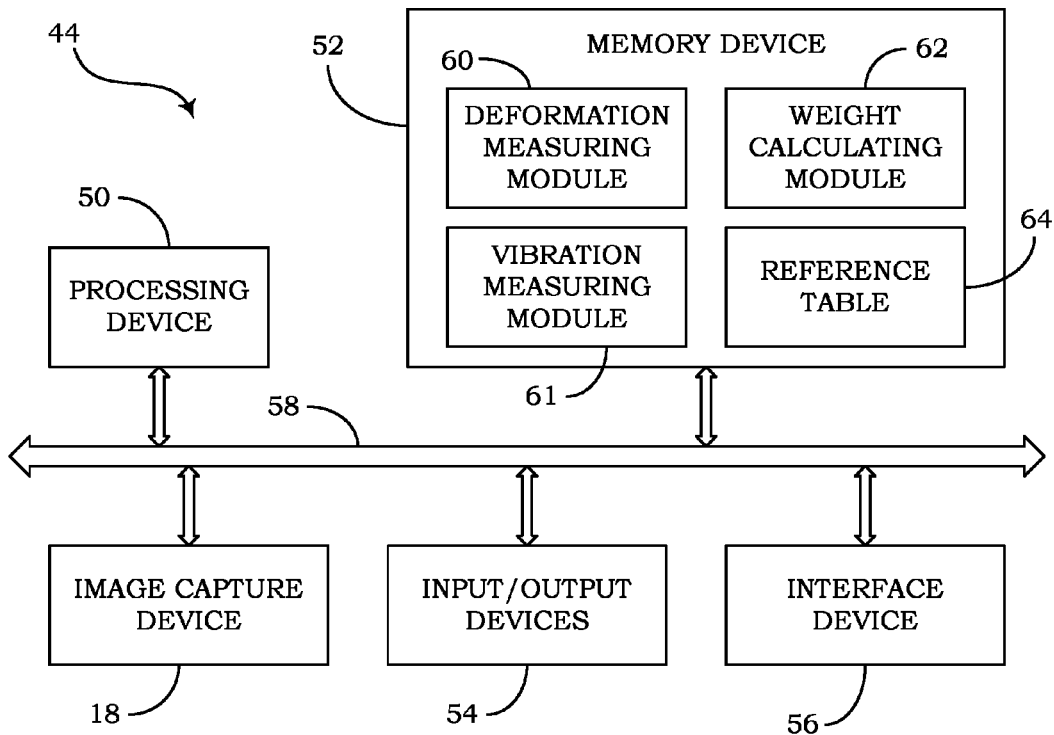
FIG. 7

USING IMAGE DATA TO CALCULATE AN OBJECT'S WEIGHT

FIELD OF THE INVENTION

The present invention relates to calculating weight and more particularly relates to weight calculation systems and methods using optical sensing.

BACKGROUND

Generally speaking, mechanical and electrical scales are used for various purposes in modern economic practices. For example, scales can be used to measure the weight of foods (e.g., meats, fruits, vegetables, etc.) at grocery stores and delicatessens. Scales are also used at airports to weigh baggage and at transportation and logistics businesses for weighing packages to be shipped. Normally, these types of scales may be used to accurately measure the weight of various objects to determine a cost to a customer.

Occasionally, however, some businesses do not require that a weight calculation is precise, but only that a weight falls within a certain range or is greater than or less than a certain threshold. For example, an airline may require that each piece of luggage is less than 50 pounds. In these cases, an estimation of the weight may suffice.

Also, some businesses may base a calculation of the cost to transport an object on the greater of a scale weight and a "dimensional weight," i.e. the volume of the object multiplied by a density factor. Since it is only necessary to determine whether the scale weight is above the dimensional volumetric weight, an estimation of weight may suffice in this scenario as well. For estimating weight, less expensive equipment can be used which may also require less space.

Therefore, a need exists for alternative systems and methods for calculating weight. Particularly, there is a need for weight calculation equipment that is more cost effective and takes up less space than typical scales in use today.

SUMMARY

Accordingly, in one aspect, the present invention embraces systems and methods for calculating the weight of objects. In an exemplary embodiment, an apparatus for calculating weight comprises an image capture device configured to capture a plurality of images of a platform configured to support an object to be weighed. The platform includes known pliability characteristics. The apparatus also includes a processing device configured to calculate the weight of the object based on the plurality of images.

In another exemplary embodiment, a method for calculating the weight of an object includes a step of capturing a first image of a platform having a pliable material and a top surface on which an object to be weighed can be placed. The method also includes a step of capturing a second image of the platform after the object is placed on the top surface of the platform. Then, the weight of the object is calculated based on the first and second images.

In yet another exemplary embodiment, another method for calculating the weight of an object is provided. The method includes capturing multiple images of a pliable material of a platform when an object to be weighed is placed on a top surface of the platform. The method also includes measuring vibration parameters from the multiple images and calculating the weight of the object based on the measured vibration parameters.

The foregoing illustrative summary, as well as other exemplary objectives and/or advantages of the invention, and the manner in which the same are accomplished, are further explained within the following detailed description and its accompanying drawings.

BRIEF DESCRIPTION OF THE DRAWINGS

FIG. 5 schematically depicts a first support structure for use with the apparatus of FIG. 3, according to an embodiment of the present invention.

FIG. 6 schematically depicts a second support structure for use with the apparatus of FIG. 3, according to another embodiment of the present invention.

FIG. 7 schematically depicts a block diagram of a weight measuring unit, according to an embodiment of the present invention.

DETAILED DESCRIPTION

The present invention embraces systems and methods for calculating or estimating the weight of an object. The systems and methods of the present invention are configured to calculate weight based on an extent to which an object being weighed deforms or compresses a surface on which it is placed. The extent of deformation can be observed by an image capture device, such as a camera or video camera.

In some implementations, image capture devices, which may be used for detecting deformation, may also be used to determine the outside dimensions, and thus the volume, of a package or parcel to be shipped. For example, in the transportation and logistics industry, dimensioning devices obtain images of a package to accurately measure the volume of packages. Therefore, the image capture devices, as disclosed herein with respect to some embodiments, can execute the operations of calculating both volume and weight.

By using image capture devices, the embodiments of the present invention may reduce the cost of measuring weight relative to the cost of mechanical and/or electrical scales. Also, scales tend to be rather bulky and take up space in active areas. The use of a less-intrusive camera, as described in the present disclosure, can free up valuable space that can be used by transportation and logistics employees and customers.

In recent years, research has shown that stationary cameras can be used to detect minute displacement in an object.

According to the teachings of the present disclosure, an object, such as a package, can be placed on any platform or surface having known deformation characteristics that will deform to an extent proportional to the object's weight. By optically measuring even the finest deformations of that platform, a calculation of weight can be obtained.

In some embodiments, the systems and methods of the present invention may compare the measured extent of deformation to reference deformation data, which may be obtained by observing the deformations induced by reference objects having known weights. In this way, the reference deformation data can be obtained for any pliable material, even an ordinary countertop that is configured to support the object. The material's response to reference objects having different known weights can be explicitly referenced and used with objects having unknown weights.

Alternatively, the composition of the pliable material can be estimated and a reference database could be used to determine weight based on the particular composition. Either way, a look-up table or function can be created for mapping various surface deformation parameters to various weights. Then, when an unknown object is placed on the surface, the induced deformation can be measured optically and can be compared and/or interpolated with data in the look-up table or applied to a mapping function to translate the deformation into weight.

Figure 1:
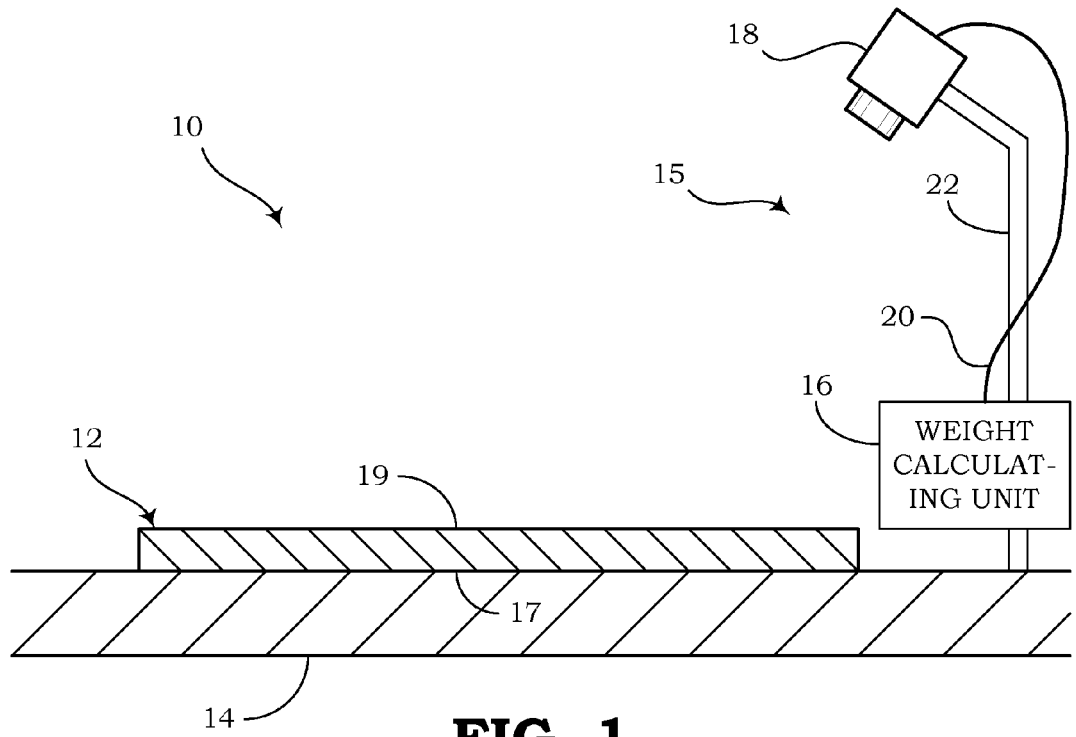
FIG. 1 schematically depicts a side view of a first apparatus for measuring weight, according to an embodiment of the present invention.
Figure 2:
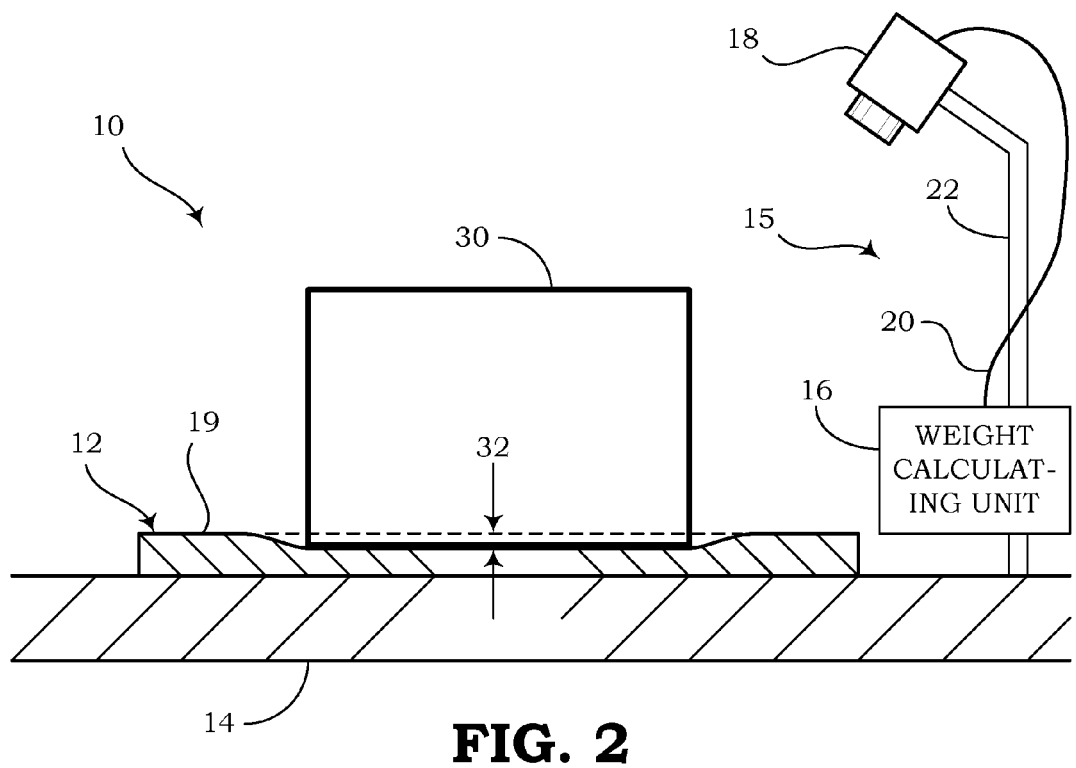
FIG. 2 schematically depicts the apparatus of FIG. 1 when an object is placed in a position for its weight to be measured, according to an embodiment of the present invention.

FIG. 1 shows a side view of a first embodiment of an image-based scale 10 for measuring weight. FIG. 2 shows the image-based scale 10 of FIG. 1 when an object 30 has been placed in a position for its weight to be measured. The image-based scale 10 may simply include a weight measuring device 15, having a weight calculating unit 16 and an image capture device 18 (e.g., camera or video camera). In some embodiments, the image-based scale 10 may also include a platform 12 and/or a base 14. In addition to the weight calculating unit 16 and image capture device 18, the weight measuring device 15 may also include other elements, such as an electrical transmission element 20 and a support structure 22.

If a particular workspace includes a base 14 having an unpredictable or rigid surface, the additional platform 12 having a material that responds more predictably with respect to weight may be used. In this case, the base 14 may be any substantially flat, substantially horizontal surface, such as a table, desk, countertop, etc., and may be separate from the other elements of the image-based scale 10. Preferably, the base 14 includes a solid, substantially inflexible material.

In the embodiment of FIG. 1, the platform 12 may be permanently, or removably, supported by the base 14, which provides supports for the entire bottom surface 17 of the platform 12. The platform 12 may include any type of pliable or flexible material, such as rubber, foam, a combination of foam and rubber, or other suitable material having known flexibility characteristics. In some embodiments, the platform 12 may include multiple layers of pliable materials, each layer having the same or different flexibility as the other layers.

The platform 12 may be optional in some embodiments, such as when a base 14 having predictable characteristics is available. In the following description, the platform 12 and base 14 may be used interchangeably.

The material of the platform 12 includes a top surface 19 that naturally springs back to its original shape when there are no objects placed thereon. However, when an object 30 having any substantial weight is placed on the platform 12, the material of the platform 12 is configured to be compressed by the object 30 to some extent, as indicated by displacement 32 shown in FIG. 2.

It should be understood that the extent 32 to which the platform 12 is compressed or deformed corresponds to the force (i.e., weight) of the object 30. Therefore, an object having a greater weight will compress the platform to a greater extent that one having a lighter weight.

Additionally, it should be noted that the extent of compression may depend on the distribution of weight of the object 30 and is not necessary uniform. Therefore, the compression characteristics of the platform 12 can be monitored at multiple points to obtain a two-dimensional weight map.

The image capture device 18 is held in a fixed position and at a fixed orientation with respect to the platform 12. For example, the image capture device 18 may be connected to the support structure 22, which may be connected to the base 14 or platform 12. The support structure 22 includes substantial stability and strength to maintain the image capture device 18 in the fixed position and orientation.

Thus, the captured images can be compared with each other to determine the exact displacement 32 of the top surface 19 of the platform 12 caused by the object 30 being placed on the top surface 19. In some cases, it may be preferable for the user to place the object 30 near the center of the platform 12 such that the characteristics of the ends of the platform 12 do not affect the deformation measurements.

The image capture device 18 may be a camera, video camera, or other device for capturing images of at least the platform 12. For measuring deformation, at least one image may be captured that provides a reference for the location of the top surface 19 of the platform 12 at its steady state (i.e., before the object 30 is placed thereon to compress the platform 12). At least one additional image may be captured after the object 30 has been placed on the platform 12.

When images are captured, the image capture device 18 can send the image data to the weight calculating unit 16 via the electrical transmission element 20. In other embodiments, a wireless transmission system may be used to communicate image data from the image capture device 18 to the weight calculating unit 16. The weight calculating unit 16 receives the image data and analyzes the displacement 32 or deformation caused by the object 30 being placed on the platform 12.

According to some embodiments of the present invention, the image capture device 18 may be a video camera configured to detect vibration characteristics of the platform 12 or base 14. The weight calculating unit 16 in these embodiments may be configured to analyze the frames of the images to determine the vibration of the top surface 19 of the platform. The vibration characteristics can be used to determine the weight of the object 30 as it is placed on the top surface 19. The image capture device 18 may be configured to capture 30, 60, or more frames per second in order to provide sufficient image data for analyzing vibration.

The image capture device 18 may be configured to capture images at a sufficient resolution to detect minute vibrations or small changes in deformation. For example, the resolution may be adequate to enable calculation of "sub-pixel" changes. The higher the resolution of the image capture device 18, the higher the precision in the ability to measure weight.

In some implementations, the image capture device 18 may be configured as a three-dimensional camera. Thus, the weight calculating unit 16 may be configured to analyze spatial characteristics of the images to determine the volume of the object 30 placed on the platform 12. For example, the image capture device 18 and weight calculating unit 16 may be configured as a dimensioner.

Figure 3:
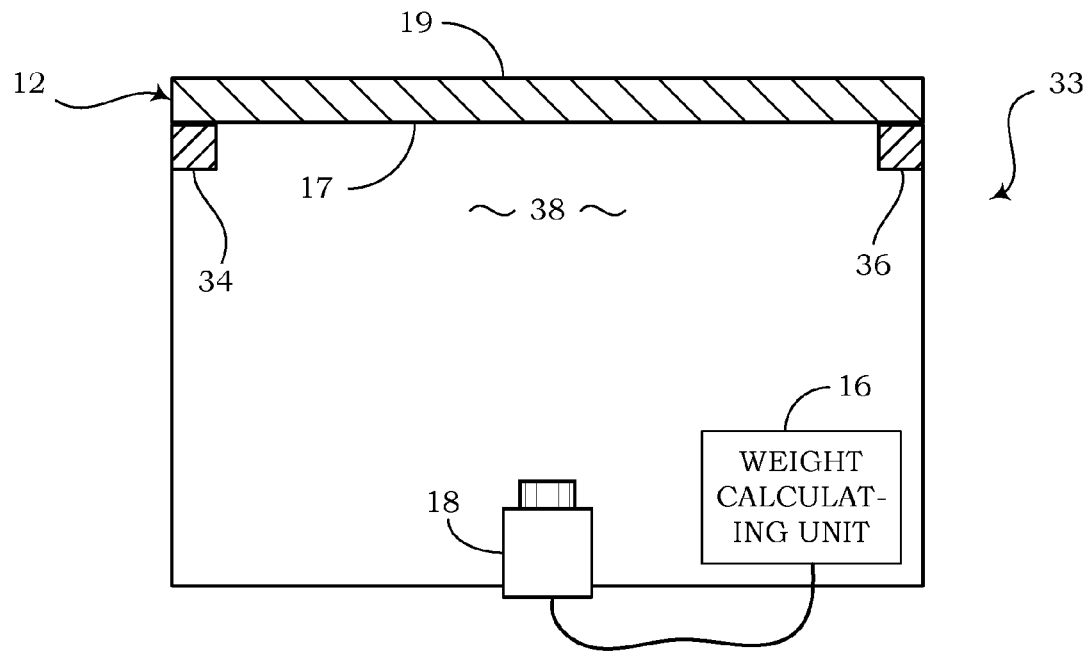
FIG. 3 schematically depicts a side view of a second apparatus for measuring weight, according to an embodiment of the present invention.

FIG. 3 shows a side view of a second embodiment of an apparatus 33 for measuring weight. In this embodiment of FIG. 3, the apparatus 33 is configured to measure the extent of deformation or vibration from a perspective of the bottom surface 17 of the platform 12. As shown in FIG. 3, the apparatus 33 includes the platform 12, a first support wall 34, and a second support wall 36.

The platform 12 may be configured with substantially sturdy material to enable it to be suspended over an area 38 generally defined between the first and second support walls 34, 36. It should be recognized that the suspended portion of the platform 12 is not supported by the support walls 34, 36 or other structures, thereby allowing the central portions of the platform 12 to sag when force is applied on a top surface of the platform 12.

Figure 4:
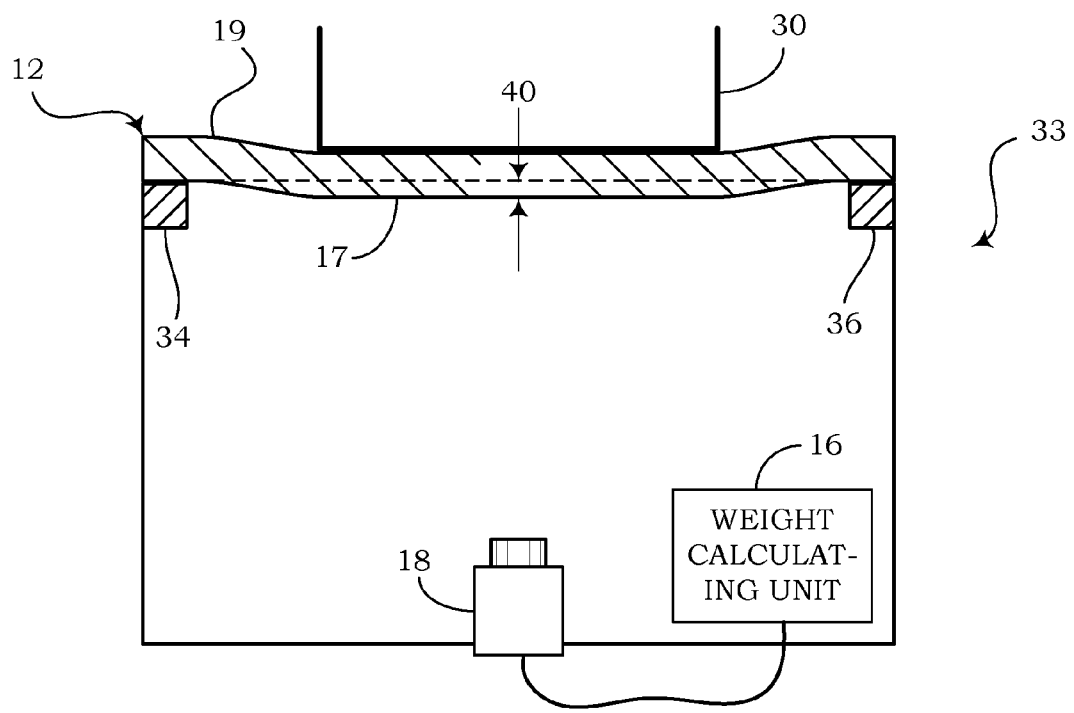
FIG. 4 schematically depicts the apparatus of FIG. 3 when an object is placed in a position for its weight to be measured, according to an embodiment of the present invention.

FIG. 4 shows the apparatus 33 of FIG. 3 when the object 30 is placed in a position for its weight to be measured. The weight of the object 30 causes the platform 12 to sag by a certain displacement 40. It should be recognized, however, that the displacement 40 may vary, depending on the size, shape, and weight distribution of the object 30 and the known flexibility characteristics of the platform 12. Although the platform 12 includes substantial sturdiness to allow it to be suspended across the support walls 34, 36, the material of the platform 12 may also include a suitable amount of flexibility to provide optically detectable displacement and/or vibration when the object 30 is placed thereon.

In the embodiment of FIG. 3, the image capture device 18 is positioned beneath the platform 12 such that the field of view of the image capture device 18 includes substantially the entire bottom surface 17 of the platform 12. As described above with respect to the embodiment of FIG. 1, the embodiment of FIG. 3 can be operated in substantially the same manner.

For example, with respect to measuring displacement, at least one image is captured before the object 30 is placed on the platform 12 and at least one additional image is captured after the object 30 is placed thereon. The image data is communicated to the weight calculating unit 16, which analyzes the displacement 40 or sag caused by the object 30. Knowing the flexibility characteristics of the platform 12, the displacement 40 can be correlated to weight to determine the weight of the object 30.

With respect to measuring vibration, video images of the bottom surface 17 of the platform 12 can be obtained. The vibration data can then be used to determine weight of the object 30.

FIG. 5 shows an isometric view of an embodiment of a first support structure to be used with the apparatus 33 of FIG. 3 for suspending the platform 12. In this embodiment, the support structure includes the first support wall 34 and second support wall 36 shown in FIGS. 3 and 4. The platform 12 is permanently or removably positioned on top of the support walls 34, 36 to suspend the platform 12 over the area 38.

FIG. 6 shows an isometric view of another embodiment of a support structure that may be used with the apparatus of FIG. 3. In this exemplary embodiment, the support structure includes a frame 39 having walls that correspond to each of the end portions of the platform 12. As shown, the platform 12 may be square or rectangular, and thereby the frame 39 may also be a square or rectangular structure for supporting the left, right, front, and back edges of the platform 12.

In other embodiments, when the platform 12 includes other shapes, the frame 38 may be configured to accommodate the corresponding edge portions of the platform 12. It should be noted that the frame 39 may generally define the area 38 over which the platform 12 is suspended.

FIG. 7 shows a block diagram of an embodiment of a weight measuring device 44. In this embodiment, the weight measuring device 44 includes the image capture device 18 as shown in FIG. 1-4, a processing device 50, a memory device 52, input/output devices 54, and an interface device 56, each interconnected and in communication with each other via a bus interface 58. As shown, the embodiment of the memory device 52 may include a deformation measuring module 60, a vibration measuring module 61, a weight calculating module 62, and a reference table 64. The memory device 52 may include one or both of the deformation measuring module 60 and vibration measuring module 61.

According to some embodiments, the components of the weight measuring device 44 may be disposed in a housing (not shown). The housing may be connected to support structures for fixedly positioning the housing with respect to the platform 12 or base 14. In other embodiments, the image capture device 18 may be configured in a different housing separate from the other elements of the weight measuring device 44, such as in the embodiments shown in FIGS. 1-4. In this case, the support structure may be configured to fixedly support just the image capture device 18.

The processing device 50 may include any number of processors, microprocessors, etc. for controlling the operations of the weight measuring device 44. The memory device 52 may be configured using volatile and non-volatile memory elements for storing data, information, calculations, tables, and/or software for execution by the processing device 50.

The deformation measuring module 60, vibration measuring module 61, and weight calculating module 62 may be configured in software, firmware, and/or hardware. When configured as software or firmware, the modules 60-62 may be logic programs, such as computer programs, which can be executed by the processing device 50. In other embodiments, when configured in hardware, the deformation measuring module 60, vibration measuring module 61, and/or weight calculating module 62 may be configured as logical hardware elements, such as ASICs or other suitable components.

The deformation measuring module 60 allows the processing device 50 to measure an extent of deformation, such as the deformation 32 as shown in FIG. 2 or the displacement/sag 40 as shown in FIG. 4. The deformation can be measured by comparing one or more images of the one or more surfaces (e.g., top surface 19 or bottom surface 17) of the platform 12. The deformation measurement may include the displacement at multiple points on the surface. The displacement at each point can be measured between a first position of the surface (without forces applied thereto) and a second position of the surface (when the weight of the object 30 acts on the surface).

Once the extent of the deformation is measured by the deformation measuring module 60, the weight calculating module 62 is configured to correlate or map the measured deformation to a corresponding weight. In some embodiments, the weight calculating module 62 may utilize reference data stored in the reference table 64 that maps particular deformation amounts to weight values. The weight calculating module 62 may use interpolation and/or extrapolation algorithms to determine weight values when a measured deformation is offset from stored reference values.

The vibration measuring module 61 enables the processing device 50 to measure vibration of the surfaces 17, 19 when the object 30 is being placed on the platform 12. The vibration can be measured by comparing multiple video images of the surface 17, 19 of the platform 12. The vibration measurement may include analysis of various vibrating points on the surface. When the vibration characteristics are measured, the weight calculating module 62 may be configured to correlate or map the measured vibration data to a corresponding weight. In some embodiments, the weight calculating module 62 may utilize reference data stored in the reference table 64 that maps particular vibration characteristics to weight values. The weight calculating module 62 may use interpolation and/or extrapolation algorithms to determine weight values with respect to various vibration measurements.

The input/output devices 54 may include user interfaces, such as graphical user interfaces, for enabling a user to enter information into the weight measuring device 44 and for providing information to the user. The input/output devices 54 may include keyboards, keypads, buttons, touchscreens, etc. for receiving input. Also, the input/output devices 54 may include display screens, LED displays, indicator lights, etc. for providing graphical or other indicator output to the user.

The interface device 56 may be optional and may therefore be omitted in some embodiments. When present in the weight measuring unit 44, the interface device 56 may be configured to communicate with remote devices via a network to provide information regarding measured weight of various objects to one or more other devices, which may be configured to use this information for various purposes throughout a transportation and logistics system or other system that utilizes measurements of objects throughout a transportation route. Also, the interface device 56 may be used to receive software and/or firmware updates from a server, if necessary.

Figure 8:
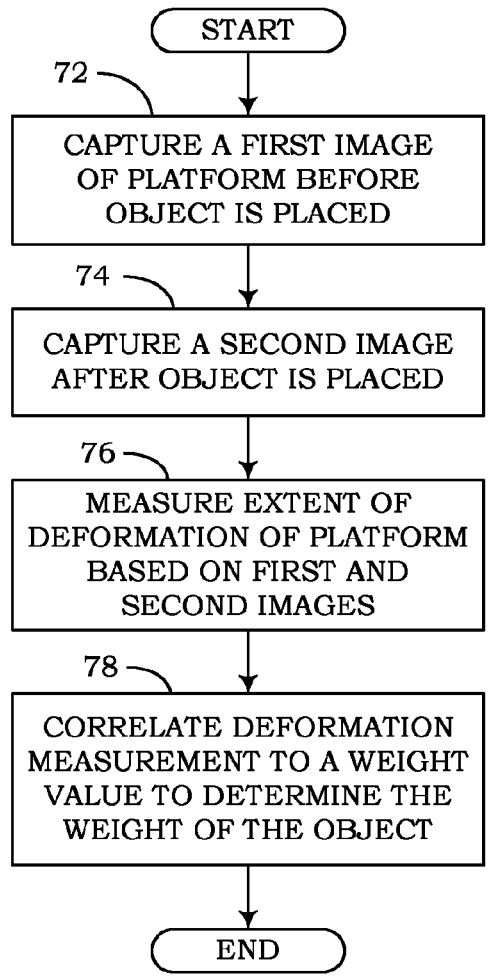
FIG. 8 schematically depicts a flow diagram of a method for calculating weight, according to an embodiment of the present invention.

FIG. 8 shows a flow diagram of an embodiment of a method 70 for calculating weight. The method 70 includes a step of capturing a first image of a platform before an object is placed on the platform, as indicated in block 72. Block 74 describes the step of capturing a second image of the platform after the object is placed on the platform. The first and second images can be obtained using an image capture device, which is preferably held in a fixed position with respect to the platform.

In block 76, the method 70 includes the step of measuring the extent of deformation of a surface of the platform. For example, the extent of deformation can be measured using optical data of the first and second captured images obtained by the image capturing device. According to some implementations, the deformation measurement may also be a measurement of vibration. The method 70 further includes using the deformation (or vibration) measurement, obtained according to block 76, to correlate the deformation (or vibration) to a weight value to determine the weight of the object.

The correlation step as indicated in block 78 may further include interpolation and/or extrapolation of reference data to obtain an accurate weight value. Alternatively, the correlation step may include using a pre-defined function or algorithm to map deformation (or vibration) information to weight information. The correlation actions may be based on reference tables and/or functions that may be defined during a reference establishing method, as described below.

Figure 9:
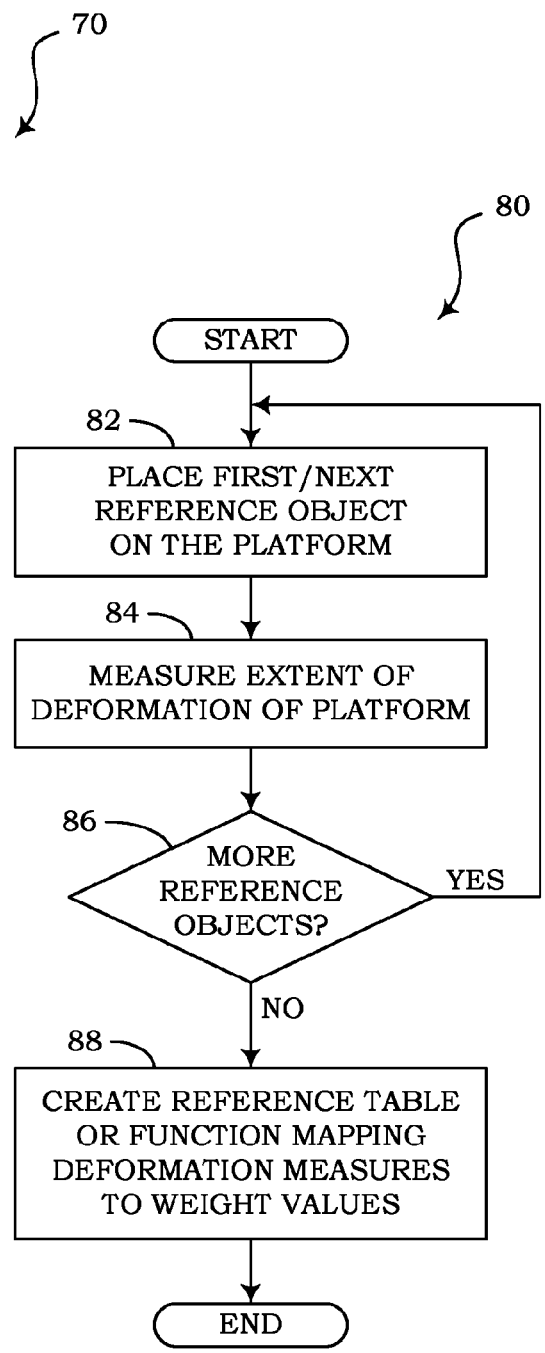
FIG. 9 schematically depicts a flow diagram of a method for establishing reference data, according to an embodiment of the present invention.

FIG. 9 shows a flow diagram of an embodiment of a method 80 for establishing reference data and/or algorithms for enabling a correlation between measured deformation data and weight values, such as the correlation described in block 78 shown in FIG. 8. This correlation method 80 may be created for use by either of the apparatuses of FIGS. 1 and 3. The reference functions and/or tables may be stored as algorithms in the weight calculating module 62 and/or in the reference table 64.

Specifically, the method 80 includes a first block (i.e., block 82) describing a step of prompting a user to place a first reference object on a platform having unknown flexibility characteristics, such as the platform 12. In some embodiments, the first and other reference objects may have a known weight. Block 84 describes the step of measuring an extent of deformation of the platform with the first reference object placed thereon. Again, the correlation obtaining method may include calibrating weight measurement values not only to deformation characteristics, but also to vibration characteristics.

The method 80 includes determining, as indicated in decision block 86, whether or not more reference objects are meant to be used for correlation purposes. If so, the method 80 loops back to block 82, which indicates that the next reference object is placed on the platform for which another extent of deformation (or vibration) is measured (block 84). If it is determined, according to decision block 86, that no more reference objects are to be used, the method 80 proceeds to block 88. As indicated in block 88, the method 80 includes the step of creating reference tables and/or functions or algorithms. The tables, functions, and/or algorithm are configured to map or correlate deformation (or vibration) measurements obtained according to block 84 to known weight values of the reference objects.

As defined above, the present disclosure therefore provides systems and methods for calculating the weight of an object. According to one embodiment, an apparatus is provided for calculating weight, the apparatus comprising a platform having a known pliable material and a top surface configured to support an object to be weighed. The apparatus may further include an image capture device configured to capture a plurality of images of the platform. A processing device of the apparatus is configured to calculate the weight of the object based on the at least one image.

Furthermore, the processing device may be configured to calculate the weight of the object by measuring the extent of deformation of the pliable material in response to the object being placed on the platform. The processing device may further be configured to compare the measured extent of deformation with reference deformation data.

The image capture device, which may be a video camera, may be configured to capture images of the top surface of the platform. A support structure may also be used for supporting the image capture device at a fixed position and orientation with respect to the platform. Also, the apparatus may include a base configured to support the platform. The base may comprise at least two walls configured to support at least two ends of the platform such that a middle section of the platform is suspended over an area between the at least two walls. In this implementation, the image capture device may be configured to capture images of a bottom surface of the platform.

The pliable material has a known pliability response to applied forces. For example, the pliable material may include at least one of rubber and foam.

According to methods for calculating the weight of an object, based on the above description, an exemplary method may include a step of capturing a first image of a platform. The platform may include a pliable material and a top surface on which an object to be weighed can be placed. The method also includes a step of capturing a second image of the platform after the object is placed on the top surface of the platform. Based on the first and second images, the weight of the object can be calculated.

The step of calculating the weight of the object includes measuring an extent of deformation of the pliable material after the object is placed on the top surface of the platform. The calculating step further includes comparing the extent of deformation with reference deformation data. This or another method may include additional preliminary steps of placing reference objects having known weights on the platform one at a time and measuring the extent of deformation of the pliable material corresponding to the weight of each reference object to obtain the reference deformation data. The reference deformation data may be stored in such a way to create a table or function mapping deformation to weight.

The steps of capturing the first and second images may include capturing the images of the top surface of the platform. Alternatively, the steps of capturing the first and second images may include capturing the images of a bottom surface of the platform. For instance, the bottom surface may be suspended over an area between the ends of the platform. The step of capturing the first and second images may include capturing the images from a fixed location and orientation with respect to the platform. In some embodiments, the method may further include the step of utilizing at least one of the first and second images to determine the dimensions of the object.

To supplement the present disclosure, this application incorporates entirely by reference the following commonly assigned patents, patent application publications, and patent applications:

U.S. Pat. No. 6,832,725; U.S. Pat. No. 7,128,266; U.S. Pat. No. 7,159,783; U.S. Pat. No. 7,413,127; U.S. Pat. No. 7,726,575; U.S. Pat. No. 8,294,969; U.S. Pat. No. 8,317,105; U.S. Pat. No. 8,322,622; U.S. Pat. No. 8,366,005; U.S. Pat. No. 8,371,507; U.S. Pat. No. 8,376,233; U.S. Pat. No. 8,381,979; U.S. Pat. No. 8,390,909; U.S. Pat. No. 8,408,464; U.S. Pat. No. 8,408,468; U.S. Pat. No. 8,408,469; U.S. Pat. No. 8,424,768; U.S. Pat. No. 8,448,863; U.S. Pat. No. 8,457,013; U.S. Pat. No. 8,459,557; U.S. Pat. No. 8,469,272; U.S. Pat. No. 8,474,712; U.S. Pat. No. 8,479,992; U.S. Pat. No. 8,490,877; U.S. Pat. No. 8,517,271; U.S. Pat. No. 8,523,076; U.S. Pat. No. 8,528,818; U.S. Pat. No. 8,544,737; U.S. Pat. No. 8,548,242; U.S. Pat. No. 8,548,420; U.S. Pat. No. 8,550,335; U.S. Pat. No. 8,550,354; U.S. Pat. No. 8,550,357; U.S. Pat. No. 8,556,174; U.S. Pat. No. 8,556,176; U.S. Pat. No. 8,556,177; U.S. Pat. No. 8,559,767; U.S. Pat. No. 8,599,957; U.S. Pat. No. 8,561,895; U.S. Pat. No. 8,561,903; U.S. Pat. No. 8,561,905; U.S. Pat. No. 8,565,107; U.S. Pat. No. 8,571,307; U.S. Pat. No. 8,579,200; U.S. Pat. No. 8,583,924; U.S. Pat. No. 8,584,945; U.S. Pat. No. 8,587,595; U.S. Pat. No. 8,587,697; U.S. Pat. No. 8,588,869; U.S. Pat. No. 8,590,789; U.S. Pat. No. 8,596,539; U.S. Pat. No. 8,596,542; U.S. Pat. No. 8,596,543; U.S. Pat. No. 8,599,271; U.S. Pat. No. 8,599,957; U.S. Pat. No. 8,600,158; U.S. Pat. No. 8,600,167; U.S. Pat. No. 8,602,309; U.S. Pat. No. 8,608,053; U.S. Pat. No. 8,608,071; U.S. Pat. No. 8,611,309; U.S. Pat. No. 8,615,487; U.S. Pat. No. 8,616,454; U.S. Pat. No. 8,621,123; U.S. Pat. No. 8,622,303; U.S. Pat. No. 8,628,013; U.S. Pat. No. 8,628,015; U.S. Pat. No. 8,628,016; U.S. Pat. No. 8,629,926; U.S. Pat. No. 8,630,491; U.S. Pat. No. 8,635,309; U.S. Pat. No. 8,636,200; U.S. Pat. No. 8,636,212; U.S. Pat. No. 8,636,215; U.S. Pat. No. 8,636,224; U.S. Pat. No. 8,638,806; U.S. Pat. No. 8,640,958; U.S. Pat. No. 8,640,960; U.S. Pat. No. 8,643,717; U.S. Pat. No. 8,646,692; U.S. Pat. No. 8,646,694; U.S. Pat. No. 8,657,200; U.S. Pat. No. 8,659,397; U.S. Pat. No. 8,668,149; U.S. Pat. No. 8,678,285; U.S. Pat. No. 8,678,286; U.S. Pat. No. 8,682,077; U.S. Pat. No. 8,687,282; U.S. Pat. No. 8,692,927; U.S. Pat. No. 8,695,880; U.S. Pat. No. 8,698,949; U.S. Pat. No. 8,717,494; U.S. Pat. No. 8,717,494; U.S. Pat. No. 8,720,783; U.S. Pat. No. 8,723,804; U.S. Pat. No. 8,723,904; U.S. Pat. No. 8,727,223; U.S. Pat. No. D702,237; U.S. Pat. No. 8,740,082; U.S. Pat. No. 8,740,085; U.S. Pat. No. 8,746,563; U.S. Pat. No. 8,750,445; U.S. Pat. No. 8,752,766; U.S. Pat. No. 8,756,059; U.S. Pat. No. 8,757,495; U.S. Pat. No. 8,760,563; U.S. Pat. No. 8,763,909; U.S. Pat. No. 8,777,108; U.S. Pat. No. 8,777,109; U.S. Pat. No. 8,779,898; U.S. Pat. No. 8,781,520; U.S. Pat. No. 8,783,573; U.S. Pat. No. 8,789,757; U.S. Pat. No. 8,789,758; U.S. Pat. No. 8,789,759; U.S. Pat. No. 8,794,520; U.S. Pat. No. 8,794,522; U.S. Pat. No. 8,794,525; U.S. Pat. No. 8,794,526; U.S. Pat. No. 8,798,367; U.S. Pat. No. 8,807,431; U.S. Pat. No. 8,807,432; U.S. Pat. No. 8,820,630; U.S. Pat. No. 8,822,848; U.S. Pat. No. 8,824,692; U.S. Pat. No. 8,824,696; U.S. Pat. No. 8,842,849; U.S. Pat. No. 8,844,822; U.S. Pat. No. 8,844,823; U.S. Pat. No. 8,849,019; U.S. Pat. No. 8,851,383; U.S. Pat. No. 8,854,633; U.S. Pat. No. 8,866,963; U.S. Pat. No. 8,868,421; U.S. Pat. No. 8,868,519; U.S. Pat. No. 8,868,802; U.S. Pat. No. 8,868,803; U.S. Pat. No. 8,870,074; U.S. Pat. No. 8,879,639; U.S. Pat. No. 8,880,426; U.S. Pat. No. 8,881,983; U.S. Pat. No. 8,881,987; U.S. Pat. No. 8,903,172; U.S. Pat. No. 8,908,995; U.S. Pat. No. 8,910,870; U.S. Pat. No. 8,910,875; U.S. Pat. No. 8,914,290; U.S. Pat. No. 8,914,788; U.S. Pat. No. 8,915,439; U.S. Pat. No. 8,915,444; U.S. Pat. No. 8,916,789; U.S. Pat. No. 8,918,250; U.S. Pat. No. 8,918,564; U.S. Pat. No. 8,925,818; U.S. Pat. No. 8,939,374; U.S. Pat. No. 8,942,480; U.S. Pat. No. 8,944,313; U.S. Pat. No. 8,944,327; U.S. Pat. No. 8,944,332; U.S. Pat. No. 8,950,678; U.S. Pat. No. 8,967,468; U.S. Pat. No. 8,971,346; U.S. Pat. No. 8,976,030; U.S. Pat. No. 8,976,368; U.S. Pat. No. 8,978,981; U.S. Pat. No. 8,978,983; U.S. Pat. No. 8,978,984; U.S. Pat. No. 8,985,456; U.S. Pat. No. 8,985,457; U.S. Pat. No. 8,985,459; U.S. Pat. No. 8,985,461; U.S. Pat. No. 8,988,578; U.S. Pat. No. 8,988,590; U.S. Pat. No. 8,991,704; U.S. Pat. No. 8,996,194; U.S. Pat. No. 8,996,384; U.S. Pat. No. 9,002,641; U.S. Pat. No. 9,007,368; U.S. Pat. No. 9,010,641; U.S. Pat. No. 9,015,513; U.S. Pat. No. 9,016,576; U.S. Pat. No. 9,022,288; U.S. Pat. No. 9,030,964; U.S. Pat. No. 9,033,240; U.S. Pat. No. 9,033,242; U.S. Pat. No. 9,036,054; U.S. Pat. No. 9,037,344; U.S. Pat. No. 9,038,911; U.S. Pat. No. 9,038,915; U.S. Pat. No. 9,047,098; U.S. Pat. No. 9,047,359; U.S. Pat. No. 9,047,420; U.S. Pat. No. 9,047,525; U.S. Pat. No. 9,047,531; U.S. Pat. No. 9,053,055; U.S. Pat. No. 9,053,378; U.S. Pat. No. 9,053,380; U.S. Pat. No. 9,058,526; U.S. Pat. No. 9,064,165; U.S. Pat. No. 9,064,167;

U.S. Pat. No. 9,064,168; U.S. Pat. No. 9,064,254;
U.S. Pat. No. 9,066,032; U.S. Pat. No. 9,070,032;
U.S. Design Pat. No. D716,285;
U.S. Design Pat. No. D723,560;
U.S. Design Pat. No. D730,357;
U.S. Design Pat. No. D730,901;
U.S. Design Pat. No. D730,902;
U.S. Design Pat. No. D733,112;
U.S. Design Pat. No. D734,339;
International Publication No. 2013/163789;
International Publication No. 2013/173985;
International Publication No. 2014/019130;
International Publication No. 2014/110495;
U.S. Patent Application Publication No. 2008/0185432;
U.S. Patent Application Publication No. 2009/0134221;
U.S. Patent Application Publication No. 2010/0177080;
U.S. Patent Application Publication No. 2010/0177076;
U.S. Patent Application Publication No. 2010/0177707;
U.S. Patent Application Publication No. 2010/0177749;
U.S. Patent Application Publication No. 2010/0265880;
U.S. Patent Application Publication No. 2011/0202554;
U.S. Patent Application Publication No. 2012/0111946;
U.S. Patent Application Publication No. 2012/0168511;
U.S. Patent Application Publication No. 2012/0168512;
U.S. Patent Application Publication No. 2012/0193423;
U.S. Patent Application Publication No. 2012/0203647;
U.S. Patent Application Publication No. 2012/0223141;
U.S. Patent Application Publication No. 2012/0228382;
U.S. Patent Application Publication No. 2012/0248188;
U.S. Patent Application Publication No. 2013/0043312;
U.S. Patent Application Publication No. 2013/0082104;
U.S. Patent Application Publication No. 2013/0175341;
U.S. Patent Application Publication No. 2013/0175343;
U.S. Patent Application Publication No. 2013/0257744;
U.S. Patent Application Publication No. 2013/0257759;
U.S. Patent Application Publication No. 2013/0270346;
U.S. Patent Application Publication No. 2013/0287258;
U.S. Patent Application Publication No. 2013/0292475;
U.S. Patent Application Publication No. 2013/0292477;
U.S. Patent Application Publication No. 2013/0293539;
U.S. Patent Application Publication No. 2013/0293540;
U.S. Patent Application Publication No. 2013/0306728;
U.S. Patent Application Publication No. 2013/0306731;
U.S. Patent Application Publication No. 2013/0307964;
U.S. Patent Application Publication No. 2013/0308625;
U.S. Patent Application Publication No. 2013/0313324;
U.S. Patent Application Publication No. 2013/0313325;
U.S. Patent Application Publication No. 2013/0342717;
U.S. Patent Application Publication No. 2014/0001267;
U.S. Patent Application Publication No. 2014/0008439;
U.S. Patent Application Publication No. 2014/0025584;
U.S. Patent Application Publication No. 2014/0034734;
U.S. Patent Application Publication No. 2014/0036848;
U.S. Patent Application Publication No. 2014/0039693;
U.S. Patent Application Publication No. 2014/0042814;
U.S. Patent Application Publication No. 2014/0049120;
U.S. Patent Application Publication No. 2014/0049635;
U.S. Patent Application Publication No. 2014/0061306;
U.S. Patent Application Publication No. 2014/0063289;
U.S. Patent Application Publication No. 2014/0066136;
U.S. Patent Application Publication No. 2014/0067692;
U.S. Patent Application Publication No. 2014/0070005;
U.S. Patent Application Publication No. 2014/0071840;
U.S. Patent Application Publication No. 2014/0074746;
U.S. Patent Application Publication No. 2014/0076974;
U.S. Patent Application Publication No. 2014/0078341;
U.S. Patent Application Publication No. 2014/0078345;
U.S. Patent Application Publication No. 2014/0097249;
U.S. Patent Application Publication No. 2014/0098792;
U.S. Patent Application Publication No. 2014/0100813;
U.S. Patent Application Publication No. 2014/0103115;
U.S. Patent Application Publication No. 2014/0104413;
U.S. Patent Application Publication No. 2014/0104414;
U.S. Patent Application Publication No. 2014/0104416;
U.S. Patent Application Publication No. 2014/0104451;
U.S. Patent Application Publication No. 2014/0106594;
U.S. Patent Application Publication No. 2014/0106725;
U.S. Patent Application Publication No. 2014/0108010;
U.S. Patent Application Publication No. 2014/0108402;
U.S. Patent Application Publication No. 2014/0110485;
U.S. Patent Application Publication No. 2014/0114530;
U.S. Patent Application Publication No. 2014/0124577;
U.S. Patent Application Publication No. 2014/0124579;
U.S. Patent Application Publication No. 2014/0125842;
U.S. Patent Application Publication No. 2014/0125853;
U.S. Patent Application Publication No. 2014/0125999;
U.S. Patent Application Publication No. 2014/0129378;
U.S. Patent Application Publication No. 2014/0131438;
U.S. Patent Application Publication No. 2014/0131441;
U.S. Patent Application Publication No. 2014/0131443;
U.S. Patent Application Publication No. 2014/0131444;
U.S. Patent Application Publication No. 2014/0131445;
U.S. Patent Application Publication No. 2014/0131448;
U.S. Patent Application Publication No. 2014/0133379;
U.S. Patent Application Publication No. 2014/0136208;
U.S. Patent Application Publication No. 2014/0140585;
U.S. Patent Application Publication No. 2014/0151453;
U.S. Patent Application Publication No. 2014/0152882;
U.S. Patent Application Publication No. 2014/0158770;
U.S. Patent Application Publication No. 2014/0159869;
U.S. Patent Application Publication No. 2014/0166755;
U.S. Patent Application Publication No. 2014/0166759;
U.S. Patent Application Publication No. 2014/0168787;
U.S. Patent Application Publication No. 2014/0175165;
U.S. Patent Application Publication No. 2014/0175172;
U.S. Patent Application Publication No. 2014/0191644;
U.S. Patent Application Publication No. 2014/0191913;
U.S. Patent Application Publication No. 2014/0197238;
U.S. Patent Application Publication No. 2014/0197239;
U.S. Patent Application Publication No. 2014/0197304;
U.S. Patent Application Publication No. 2014/0214631;
U.S. Patent Application Publication No. 2014/0217166;
U.S. Patent Application Publication No. 2014/0217180;
U.S. Patent Application Publication No. 2014/0231500;
U.S. Patent Application Publication No. 2014/0232930;
U.S. Patent Application Publication No. 2014/0247315;
U.S. Patent Application Publication No. 2014/0263493;
U.S. Patent Application Publication No. 2014/0263645;
U.S. Patent Application Publication No. 2014/0267609;
U.S. Patent Application Publication No. 2014/0270196;
U.S. Patent Application Publication No. 2014/0270229;
U.S. Patent Application Publication No. 2014/0278387;
U.S. Patent Application Publication No. 2014/0278391;
U.S. Patent Application Publication No. 2014/0282210;
U.S. Patent Application Publication No. 2014/0284384;
U.S. Patent Application Publication No. 2014/0288933;
U.S. Patent Application Publication No. 2014/0297058;
U.S. Patent Application Publication No. 2014/0299665;
U.S. Patent Application Publication No. 2014/0312121;
U.S. Patent Application Publication No. 2014/0319220;
U.S. Patent Application Publication No. 2014/0319221;
U.S. Patent Application Publication No. 2014/0326787;
U.S. Patent Application Publication No. 2014/0332590;
U.S. Patent Application Publication No. 2014/0344943;

U.S. Patent Application Publication No. 2014/0346233;
U.S. Patent Application Publication No. 2014/0351317;
U.S. Patent Application Publication No. 2014/0353373;
U.S. Patent Application Publication No. 2014/0361073;
U.S. Patent Application Publication No. 2014/0361082;
U.S. Patent Application Publication No. 2014/0362184;
U.S. Patent Application Publication No. 2014/0363015;
U.S. Patent Application Publication No. 2014/0369511;
U.S. Patent Application Publication No. 2014/0374483;
U.S. Patent Application Publication No. 2014/0374485;
U.S. Patent Application Publication No. 2015/0001301;
U.S. Patent Application Publication No. 2015/0001304;
U.S. Patent Application Publication No. 2015/0003673;
U.S. Patent Application Publication No. 2015/0009338;
U.S. Patent Application Publication No. 2015/0009610;
U.S. Patent Application Publication No. 2015/0014416;
U.S. Patent Application Publication No. 2015/0021397;
U.S. Patent Application Publication No. 2015/0028102;
U.S. Patent Application Publication No. 2015/0028103;
U.S. Patent Application Publication No. 2015/0028104;
U.S. Patent Application Publication No. 2015/0029002;
U.S. Patent Application Publication No. 2015/0032709;
U.S. Patent Application Publication No. 2015/0039309;
U.S. Patent Application Publication No. 2015/0039878;
U.S. Patent Application Publication No. 2015/0040378;
U.S. Patent Application Publication No. 2015/0048168;
U.S. Patent Application Publication No. 2015/0049347;
U.S. Patent Application Publication No. 2015/0051992;
U.S. Patent Application Publication No. 2015/0053766;
U.S. Patent Application Publication No. 2015/0053768;
U.S. Patent Application Publication No. 2015/0053769;
U.S. Patent Application Publication No. 2015/0060544;
U.S. Patent Application Publication No. 2015/0062366;
U.S. Patent Application Publication No. 2015/0063215;
U.S. Patent Application Publication No. 2015/0063676;
U.S. Patent Application Publication No. 2015/0069130;
U.S. Patent Application Publication No. 2015/0071819;
U.S. Patent Application Publication No. 2015/0083800;
U.S. Patent Application Publication No. 2015/0086114;
U.S. Patent Application Publication No. 2015/0088522;
U.S. Patent Application Publication No. 2015/0096872;
U.S. Patent Application Publication No. 2015/0099557;
U.S. Patent Application Publication No. 2015/0100196;
U.S. Patent Application Publication No. 2015/0102109;
U.S. Patent Application Publication No. 2015/0115035;
U.S. Patent Application Publication No. 2015/0127791;
U.S. Patent Application Publication No. 2015/0128116;
U.S. Patent Application Publication No. 2015/0129659;
U.S. Patent Application Publication No. 2015/0133047;
U.S. Patent Application Publication No. 2015/0134470;
U.S. Patent Application Publication No. 2015/0136851;
U.S. Patent Application Publication No. 2015/0136854;
U.S. Patent Application Publication No. 2015/0142492;
U.S. Patent Application Publication No. 2015/0144692;
U.S. Patent Application Publication No. 2015/0144698;
U.S. Patent Application Publication No. 2015/0144701;
U.S. Patent Application Publication No. 2015/0149946;
U.S. Patent Application Publication No. 2015/0161429;
U.S. Patent Application Publication No. 2015/0169925;
U.S. Patent Application Publication No. 2015/0169929;
U.S. Patent Application Publication No. 2015/0178523;
U.S. Patent Application Publication No. 2015/0178534;
U.S. Patent Application Publication No. 2015/0178535;
U.S. Patent Application Publication No. 2015/0178536;
U.S. Patent Application Publication No. 2015/0178537;
U.S. Patent Application Publication No. 2015/0181093;
U.S. Patent Application Publication No. 2015/0181109;

U.S. patent application Ser. No. 13/367,978 for a Laser Scanning Module Employing an Elastomeric U-Hinge Based Laser Scanning Assembly, filed Feb. 7, 2012 (Feng et al.);
U.S. patent application Ser. No. 29/458,405 for an Electronic Device, filed Jun. 19, 2013 (Fitch et al.);
U.S. patent application Ser. No. 29/459,620 for an Electronic Device Enclosure, filed Jul. 2, 2013 (London et al.);
U.S. patent application Ser. No. 29/468,118 for an Electronic Device Case, filed Sep. 26, 2013 (Oberpriller et al.);
U.S. patent application Ser. No. 14/150,393 for Indicia-reader Having Unitary Construction Scanner, filed Jan. 8, 2014 (Colavito et al.);
U.S. patent application Ser. No. 14/200,405 for Indicia Reader for Size-Limited Applications filed Mar. 7, 2014 (Feng et al.);
U.S. patent application Ser. No. 14/231,898 for Hand-Mounted Indicia-Reading Device with Finger Motion Triggering filed Apr. 1, 2014 (Van Horn et al.);
U.S. patent application Ser. No. 29/486,759 for an Imaging Terminal, filed Apr. 2, 2014 (Oberpriller et al.);
U.S. patent application Ser. No. 14/257,364 for Docking System and Method Using Near Field Communication filed Apr. 21, 2014 (Showering);
U.S. patent application Ser. No. 14/264,173 for Autofocus Lens System for Indicia Readers filed Apr. 29, 2014 (Ackley et al.);
U.S. patent application Ser. No. 14/277,337 for MULTIPURPOSE OPTICAL READER, filed May 14, 2014 (Jovanovski et al.);
U.S. patent application Ser. No. 14/283,282 for TERMINAL HAVING ILLUMINATION AND FOCUS CONTROL filed May 21, 2014 (Liu et al.);
U.S. patent application Ser. No. 14/327,827 for a MOBILE-PHONE ADAPTER FOR ELECTRONIC TRANSACTIONS, filed Jul. 10, 2014 (Hejl);
U.S. patent application Ser. No. 14/334,934 for a SYSTEM AND METHOD FOR INDICIA VERIFICATION, filed Jul. 18, 2014 (Hejl);
U.S. patent application Ser. No. 14/339,708 for LASER SCANNING CODE SYMBOL READING SYSTEM, filed Jul. 24, 2014 (Xian et al.);
U.S. patent application Ser. No. 14/340,627 for an AXIALLY REINFORCED FLEXIBLE SCAN ELEMENT, filed Jul. 25, 2014 (Rueblinger et al.);
U.S. patent application Ser. No. 14/446,391 for MULTIFUNCTION POINT OF SALE APPARATUS WITH OPTICAL SIGNATURE CAPTURE filed Jul. 30, 2014 (Good et al.);
U.S. patent application Ser. No. 14/452,697 for INTERACTIVE INDICIA READER, filed Aug. 6, 2014 (Todeschini);
U.S. patent application Ser. No. 14/453,019 for DIMENSIONING SYSTEM WITH GUIDED ALIGNMENT, filed Aug. 6, 2014 (Li et al.);
U.S. patent application Ser. No. 14/462,801 for MOBILE COMPUTING DEVICE WITH DATA COGNITION SOFTWARE, filed on Aug. 19, 2014 (Todeschini et al.);
U.S. patent application Ser. No. 14/483,056 for VARIABLE DEPTH OF FIELD BARCODE SCANNER filed Sep. 10, 2014 (McCloskey et al.);
U.S. patent application Ser. No. 14/513,808 for IDENTIFYING INVENTORY ITEMS IN A STORAGE FACILITY filed Oct. 14, 2014 (Singel et al.);
U.S. patent application Ser. No. 14/519,195 for HAND-HELD DIMENSIONING SYSTEM WITH FEEDBACK filed Oct. 21, 2014 (Laffargue et al.);

U.S. patent application Ser. No. 14/519,179 for DIMENSIONING SYSTEM WITH MULTIPATH INTERFERENCE MITIGATION filed Oct. 21, 2014 (Thuries et al.);

U.S. patent application Ser. No. 14/519,211 for SYSTEM AND METHOD FOR DIMENSIONING filed Oct. 21, 2014 (Ackley et al.);

U.S. patent application Ser. No. 14/519,233 for HANDHELD DIMENSIONER WITH DATA-QUALITY INDICATION filed Oct. 21, 2014 (Laffargue et al.);

U.S. patent application Ser. No. 14/519,249 for HANDHELD DIMENSIONING SYSTEM WITH MEASUREMENT-CONFORMANCE FEEDBACK filed Oct. 21, 2014 (Ackley et al.);

U.S. patent application Ser. No. 14/527,191 for METHOD AND SYSTEM FOR RECOGNIZING SPEECH USING WILDCARDS IN AN EXPECTED RESPONSE filed Oct. 29, 2014 (Braho et al.);

U.S. patent application Ser. No. 14/529,563 for ADAPTABLE INTERFACE FOR A MOBILE COMPUTING DEVICE filed Oct. 31, 2014 (Schoon et al.);

U.S. patent application Ser. No. 14/529,857 for BARCODE READER WITH SECURITY FEATURES filed Oct. 31, 2014 (Todeschini et al.);

U.S. patent application Ser. No. 14/398,542 for PORTABLE ELECTRONIC DEVICES HAVING A SEPARATE LOCATION TRIGGER UNIT FOR USE IN CONTROLLING AN APPLICATION UNIT filed Nov. 3, 2014 (Bian et al.);

U.S. patent application Ser. No. 14/531,154 for DIRECTING AN INSPECTOR THROUGH AN INSPECTION filed Nov. 3, 2014 (Miller et al.);

U.S. patent application Ser. No. 14/533,319 for BARCODE SCANNING SYSTEM USING WEARABLE DEVICE WITH EMBEDDED CAMERA filed Nov. 5, 2014 (Todeschini);

U.S. patent application Ser. No. 14/535,764 for CONCATENATED EXPECTED RESPONSES FOR SPEECH RECOGNITION filed Nov. 7, 2014 (Braho et al.);

U.S. patent application Ser. No. 14/568,305 for AUTO-CONTRAST VIEWFINDER FOR AN INDICIA READER filed Dec. 12, 2014 (Todeschini);

U.S. patent application Ser. No. 14/573,022 for DYNAMIC DIAGNOSTIC INDICATOR GENERATION filed Dec. 17, 2014 (Goldsmith);

U.S. patent application Ser. No. 14/578,627 for SAFETY SYSTEM AND METHOD filed Dec. 22, 2014 (Ackley et al.);

U.S. patent application Ser. No. 14/580,262 for MEDIA GATE FOR THERMAL TRANSFER PRINTERS filed Dec. 23, 2014 (Bowles);

U.S. patent application Ser. No. 14/590,024 for SHELVING AND PACKAGE LOCATING SYSTEMS FOR DELIVERY VEHICLES filed Jan. 6, 2015 (Payne);

U.S. patent application Ser. No. 14/596,757 for SYSTEM AND METHOD FOR DETECTING BARCODE PRINTING ERRORS filed Jan. 14, 2015 (Ackley);

U.S. patent application Ser. No. 14/416,147 for OPTICAL READING APPARATUS HAVING VARIABLE SETTINGS filed Jan. 21, 2015 (Chen et al.);

U.S. patent application Ser. No. 14/614,706 for DEVICE FOR SUPPORTING AN ELECTRONIC TOOL ON A USER'S HAND filed Feb. 5, 2015 (Oberpriller et al.);

U.S. patent application Ser. No. 14/614,796 for CARGO APPORTIONMENT TECHNIQUES filed Feb. 5, 2015 (Morton et al.);

U.S. patent application Ser. No. 29/516,892 for TABLE COMPUTER filed Feb. 6, 2015 (Bidwell et al.);

U.S. patent application Ser. No. 14/619,093 for METHODS FOR TRAINING A SPEECH RECOGNITION SYSTEM filed Feb. 11, 2015 (Pecorari);

U.S. patent application Ser. No. 14/628,708 for DEVICE, SYSTEM, AND METHOD FOR DETERMINING THE STATUS OF CHECKOUT LANES filed Feb. 23, 2015 (Todeschini);

U.S. patent application Ser. No. 14/630,841 for TERMINAL INCLUDING IMAGING ASSEMBLY filed Feb. 25, 2015 (Gomez et al.);

U.S. patent application Ser. No. 14/635,346 for SYSTEM AND METHOD FOR RELIABLE STORE-AND-FORWARD DATA HANDLING BY ENCODED INFORMATION READING TERMINALS filed Mar. 2, 2015 (Sevier);

U.S. patent application Ser. No. 29/519,017 for SCANNER filed Mar. 2, 2015 (Zhou et al.);

U.S. patent application Ser. No. 14/405,278 for DESIGN PATTERN FOR SECURE STORE filed Mar. 9, 2015 (Zhu et al.);

U.S. patent application Ser. No. 14/660,970 for DECODABLE INDICIA READING TERMINAL WITH COMBINED ILLUMINATION filed Mar. 18, 2015 (Kearney et al.);

U.S. patent application Ser. No. 14/661,013 for REPROGRAMMING SYSTEM AND METHOD FOR DEVICES INCLUDING PROGRAMMING SYMBOL filed Mar. 18, 2015 (Soule et al.);

U.S. patent application Ser. No. 14/662,922 for MULTIFUNCTION POINT OF SALE SYSTEM filed Mar. 19, 2015 (Van Horn et al.);

U.S. patent application Ser. No. 14/663,638 for VEHICLE MOUNT COMPUTER WITH CONFIGURABLE IGNITION SWITCH BEHAVIOR filed Mar. 20, 2015 (Davis et al.);

U.S. patent application Ser. No. 14/664,063 for METHOD AND APPLICATION FOR SCANNING A BARCODE WITH A SMART DEVICE WHILE CONTINUOUSLY RUNNING AND DISPLAYING AN APPLICATION ON THE SMART DEVICE DISPLAY filed Mar. 20, 2015 (Todeschini);

U.S. patent application Ser. No. 14/669,280 for TRANSFORMING COMPONENTS OF A WEB PAGE TO VOICE PROMPTS filed Mar. 26, 2015 (Funyak et al.);

U.S. patent application Ser. No. 14/674,329 for AIMER FOR BARCODE SCANNING filed Mar. 31, 2015 (Bidwell);

U.S. patent application Ser. No. 14/676,109 for INDICIA READER filed Apr. 1, 2015 (Huck);

U.S. patent application Ser. No. 14/676,327 for DEVICE MANAGEMENT PROXY FOR SECURE DEVICES filed Apr. 1, 2015 (Yeakley et al.);

U.S. patent application Ser. No. 14/676,898 for NAVIGATION SYSTEM CONFIGURED TO INTEGRATE MOTION SENSING DEVICE INPUTS filed Apr. 2, 2015 (Showering);

U.S. patent application Ser. No. 14/679,275 for DIMENSIONING SYSTEM CALIBRATION SYSTEMS AND METHODS filed Apr. 6, 2015 (Laffargue et al.);

U.S. patent application Ser. No. 29/523,098 for HANDLE FOR A TABLET COMPUTER filed Apr. 7, 2015 (Bidwell et al.);

U.S. patent application Ser. No. 14/682,615 for SYSTEM AND METHOD FOR POWER MANAGEMENT OF MOBILE DEVICES filed Apr. 9, 2015 (Murawski et al.);

U.S. patent application Ser. No. 14/686,822 for MULTIPLE PLATFORM SUPPORT SYSTEM AND METHOD filed Apr. 15, 2015 (Qu et al.);

U.S. patent application Ser. No. 14/687,289 for SYSTEM FOR COMMUNICATION VIA A PERIPHERAL HUB filed Apr. 15, 2015 (Kohtz et al.);

U.S. patent application Ser. No. 29/524,186 for SCANNER filed Apr. 17, 2015 (Zhou et al.);

U.S. patent application Ser. No. 14/695,364 for MEDICATION MANAGEMENT SYSTEM filed Apr. 24, 2015 (Sewell et al.);

U.S. patent application Ser. No. 14/695,923 for SECURE UNATTENDED NETWORK AUTHENTICATION filed Apr. 24, 2015 (Kubler et al.);

U.S. patent application Ser. No. 29/525,068 for TABLET COMPUTER WITH REMOVABLE SCANNING DEVICE filed Apr. 27, 2015 (Schulte et al.);

U.S. patent application Ser. No. 14/699,436 for SYMBOL READING SYSTEM HAVING PREDICTIVE DIAGNOSTICS filed Apr. 29, 2015 (Nahill et al.);

U.S. patent application Ser. No. 14/702,110 for SYSTEM AND METHOD FOR REGULATING BARCODE DATA INJECTION INTO A RUNNING APPLICATION ON A SMART DEVICE filed May 1, 2015 (Todeschini et al.);

U.S. patent application Ser. No. 14/702,979 for TRACKING BATTERY CONDITIONS filed May 4, 2015 (Young et al.);

U.S. patent application Ser. No. 14/704,050 for INTERMEDIATE LINEAR POSITIONING filed May 5, 2015 (Charpentier et al.);

U.S. patent application Ser. No. 14/705,012 for HANDS-FREE HUMAN MACHINE INTERFACE RESPONSIVE TO A DRIVER OF A VEHICLE filed May 6, 2015 (Fitch et al.);

U.S. patent application Ser. No. 14/705,407 for METHOD AND SYSTEM TO PROTECT SOFTWARE-BASED NETWORK-CONNECTED DEVICES FROM ADVANCED PERSISTENT THREAT filed May 6, 2015 (Hussey et al.);

U.S. patent application Ser. No. 14/707,037 for SYSTEM AND METHOD FOR DISPLAY OF INFORMATION USING A VEHICLE-MOUNT COMPUTER filed May 8, 2015 (Chamberlin);

U.S. patent application Ser. No. 14/707,123 for APPLICATION INDEPENDENT DEX/UCS INTERFACE filed May 8, 2015 (Pape);

U.S. patent application Ser. No. 14/707,492 for METHOD AND APPARATUS FOR READING OPTICAL INDICIA USING A PLURALITY OF DATA SOURCES filed May 8, 2015 (Smith et al.);

U.S. patent application Ser. No. 14/710,666 for PRE-PAID USAGE SYSTEM FOR ENCODED INFORMATION READING TERMINALS filed May 13, 2015 (Smith);

U.S. patent application Ser. No. 29/526,918 for CHARGING BASE filed May 14, 2015 (Fitch et al.);

U.S. patent application Ser. No. 14/715,672 for AUGUMENTED REALITY ENABLED HAZARD DISPLAY filed May 19, 2015 (Venkatesha et al.);

U.S. patent application Ser. No. 14/715,916 for EVALUATING IMAGE VALUES filed May 19, 2015 (Ackley);

U.S. patent application Ser. No. 14/722,608 for INTERACTIVE USER INTERFACE FOR CAPTURING A DOCUMENT IN AN IMAGE SIGNAL filed May 27, 2015 (Showering et al.);

U.S. patent application Ser. No. 29/528,165 for IN-COUNTER BARCODE SCANNER filed May 27, 2015 (Oberpriller et al.);

U.S. patent application Ser. No. 14/724,134 for ELECTRONIC DEVICE WITH WIRELESS PATH SELECTION CAPABILITY filed May 28, 2015 (Wang et al.);

U.S. patent application Ser. No. 14/724,849 for METHOD OF PROGRAMMING THE DEFAULT CABLE INTERFACE SOFTWARE IN AN INDICIA READING DEVICE filed May 29, 2015 (Barten);

U.S. patent application Ser. No. 14/724,908 for IMAGING APPARATUS HAVING IMAGING ASSEMBLY filed May 29, 2015 (Barber et al.);

U.S. patent application Ser. No. 14/725,352 for APPARATUS AND METHODS FOR MONITORING ONE OR MORE PORTABLE DATA TERMINALS (Caballero et al.);

U.S. patent application Ser. No. 29/528,590 for ELECTRONIC DEVICE filed May 29, 2015 (Fitch et al.);

U.S. patent application Ser. No. 29/528,890 for MOBILE COMPUTER HOUSING filed Jun. 2, 2015 (Fitch et al.);

U.S. patent application Ser. No. 14/728,397 for DEVICE MANAGEMENT USING VIRTUAL INTERFACES CROSS-REFERENCE TO RELATED APPLICATIONS filed Jun. 2, 2015 (Caballero);

U.S. patent application Ser. No. 14/732,870 for DATA COLLECTION MODULE AND SYSTEM filed Jun. 8, 2015 (Powilleit);

U.S. patent application Ser. No. 29/529,441 for INDICIA READING DEVICE filed Jun. 8, 2015 (Zhou et al.);

U.S. patent application Ser. No. 14/735,717 for INDICIA-READING SYSTEMS HAVING AN INTERFACE WITH A USER'S NERVOUS SYSTEM filed Jun. 10, 2015 (Todeschini);

U.S. patent application Ser. No. 14/738,038 for METHOD OF AND SYSTEM FOR DETECTING OBJECT WEIGHING INTERFERENCES filed Jun. 12, 2015 (Amundsen et al.);

U.S. patent application Ser. No. 14/740,320 for TACTILE SWITCH FOR A MOBILE ELECTRONIC DEVICE filed Jun. 16, 2015 (Bandringa);

U.S. patent application Ser. No. 14/740,373 for CALIBRATING A VOLUME DIMENSIONER filed Jun. 16, 2015 (Ackley et al.);

U.S. patent application Ser. No. 14/742,818 for INDICIA READING SYSTEM EMPLOYING DIGITAL GAIN CONTROL filed Jun. 18, 2015 (Xian et al.);

U.S. patent application Ser. No. 14/743,257 for WIRELESS MESH POINT PORTABLE DATA TERMINAL filed Jun. 18, 2015 (Wang et al.);

U.S. patent application Ser. No. 29/530,600 for CYCLONE filed Jun. 18, 2015 (Vargo et al);

U.S. patent application Ser. No. 14/744,633 for IMAGING APPARATUS COMPRISING IMAGE SENSOR ARRAY HAVING SHARED GLOBAL SHUTTER CIRCUITRY filed Jun. 19, 2015 (Wang);

U.S. patent application Ser. No. 14/744,836 for CLOUD-BASED SYSTEM FOR READING OF DECODABLE INDICIA filed Jun. 19, 2015 (Todeschini et al.);

U.S. patent application Ser. No. 14/745,006 for SELECTIVE OUTPUT OF DECODED MESSAGE DATA filed Jun. 19, 2015 (Todeschini et al.);

U.S. patent application Ser. No. 14/747,197 for OPTICAL PATTERN PROJECTOR filed Jun. 23, 2015 (Thuries et al.);

U.S. patent application Ser. No. 14/747,490 for DUAL-PROJECTOR THREE-DIMENSIONAL SCANNER filed Jun. 23, 2015 (Jovanovski et al.); and U.S. patent application Ser. No. 14/748,446 for CORDLESS INDICIA READER WITH A MULTIFUNCTION COIL FOR WIRELESS CHARGING AND EAS DEACTIVATION, filed Jun. 24, 2015 (Xie et al.).

In the specification and/or figures, typical embodiments of the invention have been disclosed. The present invention is not limited to such exemplary embodiments. The use of the term "and/or" includes any and all combinations of one or more of the associated listed items. The figures are schematic representations and so are not necessarily drawn to scale. Unless otherwise noted, specific terms have been used in a generic and descriptive sense and not for purposes of limitation.

The invention claimed is:

1. An apparatus for calculating weight, the apparatus comprising:
   an image capture device configured to capture one or more images comprising a view of a platform configured to support an object to be weighed, the platform having known pliability characteristics; and
   a processing device configured to:
   receive the one or more images comprising the view of the platform, the one or more images captured while the platform bears the weight of the object;
   ascertain an extent of deformation of at least one point on a surface of the platform based at least in part on the one or more images, the deformation resulting from the platform bearing the weight of the object; and
   calculate the weight of the object based at least in part on the known pliability characteristics of the platform and the extent of deformation of the at least one point on the surface of the platform;
   ascertain a volume of the object based at least in part on the one or more images and calculate a dimensional weight of the object; and
   provide an indication to a user if the weight of the object as calculated exceeds a threshold and/or a range corresponding to the dimensional weight of the object as calculated.

2. The apparatus of claim 1, wherein the processing device is configured to ascertain an extent of deformation of at least one point on the surface of the platform and/or to calculate the weight of the object in response to the object being placed on the platform.

3. The apparatus of claim 2, wherein the processing device is configured to compare the measured extent of deformation with reference deformation data.

4. The apparatus of claim 1, wherein the image capture device comprises a video camera, and wherein the processing device is further configured to calculate the weight of the object by measuring vibration of at least one point on a surface of the platform in response to the object being placed on the platform.

5. The apparatus of claim 1, wherein the image capture device is configured to capture images of the top surface of the platform.

6. The apparatus of claim 1, further comprising a support structure configured to support the image capture device at a fixed position and orientation with respect to the platform.

7. The apparatus of claim 1, further comprising a base configured to support the platform.

8. The apparatus of claim 7, wherein the base comprises at least two walls configured to support at least two ends of the platform such that a middle section of the platform is suspended over an area between the at least two walls, and wherein the image capture device is configured to capture images of a view of a bottom surface of the platform.

9. A method for calculating the weight of an object, the method comprising the steps of:
   receiving a first image comprising a view of a platform, the platform comprising a pliable material and a surface on which an object to be weighed can be placed;
   receiving a second image comprising a view of the platform, the second image captured while the platform bears the weight of the object;
   ascertaining an extent of deformation of at least one point on the platform based at least in part on a comparison of the second image to the first image, the deformation resulting from the platform bearing the weight of the object and calculating the weight of the object based at least in part on a relationship between the extent of deformation and the weight of the object;
   ascertaining a volume of the object based at least in part on the first image and/or the second image and calculating a dimensional weight of the object; and
   providing an indication as to whether or not the weight of the object as calculated exceeds a threshold and/or a range corresponding to the dimensional weight of the object as calculated.

10. The method of claim 9, wherein receiving a second image and/or ascertaining an extent of deformation occurs in response to the object being placed on the surface of the platform.

11. The method of claim 10, wherein ascertaining an extent of deformation includes measuring the extent of deformation of a plurality of points of pliable material.

12. The method of claim 10, wherein calculating the weight of the object comprises comparing the extent of deformation with reference deformation data.

13. The method of claim 12, comprising obtaining the reference data prior to receiving the first image and the second image, the reference data obtained at least in part by ascertaining for each of one or more reference objects having a known weight, an extent of deformation of at least one point on the platform when the platform receives the weight of a respective reference object, the deformation resulting from the platform bearing the weight of the respective reference object.

14. The method of claim 13, further comprising:
   storing the reference data in a table in a non-transitory computer readable medium; and/or
   deriving an algorithm comprising a correlation between the extent of deformation and the weight of an object mapping deformation to weight, and storing the algorithm in a non-transitory computer readable medium.

15. The method of claim 9, wherein the first image and the second image comprise a view of the surface of the platform from a fixed location and orientation with respect to the platform.

16. The method of claim 9, wherein the second image comprises a view of a bottom surface of the platform from a fixed location and orientation with respect to the platform, the bottom surface being suspended over an area between the ends of the platform.

17. The method of claim 9, further comprising ascertaining one or more dimensions of the object based at least in part on the first image and/or the second image.

18. A method for calculating the weight of an object, the method comprising the steps of:

receiving a plurality of images comprising a view of vibration occurring in at least a portion of a platform, the platform comprising a pliable material configured to vibrate when the platform receives an object;

ascertaining one or more vibration parameters of at least one point of the platform based at least in part on the plurality of images, the vibration parameters associated with the vibration occurring when the platform receives the object;

calculating the weight of the object based at least in part on a relationship between the one or more vibration parameters and the weight of the object, the relationship having been ascertained using one or more reference objects having a known weight;

ascertaining a volume of the object based at least in part on the one or more images and calculating a dimensional weight of the object; and providing an indication if the weight of the object as calculated exceeds a threshold and/or a range corresponding to the dimensional weight of the object as calculated.

19. The method of claim 18, wherein ascertaining the one or more vibration parameters comprises ascertaining one or more vibration parameters of multiple points of the pliable material.

20. The method of claim 18, wherein calculating the weight of the object comprises comparing the one or more vibration parameters with reference vibration data obtained by ascertaining the relationship using the one or more reference objects.

21. The method of claim 1, wherein calculating the weight of the object comprises calculating an imprecise estimate of the weight of the object, the imprecise estimate having an accuracy sufficient to ascertain whether or not the weight of the object as calculated exceeds the threshold and/or whether or not the weight of the object as calculated falls within the range.

22. The method of claim 9, wherein the threshold comprises the dimensional weight of the object.

23. The apparatus of claim 9, wherein the image capture device comprises a video camera, and wherein the processing device is further configured to calculate the weight of the object by measuring vibration of at least one point on a surface of the platform in response to the object being placed on the platform.

24. The method of claim 9, wherein calculating the weight of the object comprises calculating an imprecise estimate of the weight of the object, the imprecise estimate having an accuracy sufficient to ascertain whether or not the weight of the object as calculated exceeds the threshold and/or whether or not the weight of the object as calculated falls within the range.

* * * * *